United States Patent
Lazaridis et al.

(10) Patent No.: US 10,331,299 B2
(45) Date of Patent: *Jun. 25, 2019

(54) METHOD AND HANDHELD ELECTRONIC DEVICE HAVING A GRAPHICAL USER INTERFACE WHICH ARRANGES ICONS DYNAMICALLY

(71) Applicant: BlackBerry Limited, Waterloo (CA)

(72) Inventors: Mihal Lazaridis, Waterloo (CA); David Paul Yach, Waterloo (CA)

(73) Assignee: BlackBerry Limited, Waterloo (CA)

( * ) Notice: Subject to any disclaimer, the term of this patent is extended or adjusted under 35 U.S.C. 154(b) by 269 days.

This patent is subject to a terminal disclaimer.

(21) Appl. No.: 15/059,466

(22) Filed: Mar. 3, 2016

(65) Prior Publication Data

US 2016/0188135 A1    Jun. 30, 2016

Related U.S. Application Data

(63) Continuation of application No. 13/548,538, filed on Jul. 13, 2012, now Pat. No. 9,280,261, which is a
(Continued)

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 1/1626* (2013.01); *G06F 3/017* (2013.01);
(Continued)

(58) Field of Classification Search
CPC ...... G06F 3/0482; G06F 1/1626; G06F 3/017; G06F 3/04817; G06F 3/04886;
(Continued)

(56) References Cited

U.S. PATENT DOCUMENTS 5,661,632 A   8/1997 Register
7,263,668 B1  8/2007 Lentz
(Continued)

FOREIGN PATENT DOCUMENTS

EP    1562105    8/2005

OTHER PUBLICATIONS

EP; Summons to attend oral proceedings; EP 09164711.5; dated Jun. 18, 2015.
(Continued)

*Primary Examiner* — Renee D Chavez
*Assistant Examiner* — Jianmei F Duckworth
(74) *Attorney, Agent, or Firm* — Ridout and Maybee LLP

(57) ABSTRACT

A graphical user interface for a media player application is described. A method is provided comprising: (i) determining a screen orientation of the GUI in accordance with a device orientation of the handheld electronic device; (ii) displaying a first user interface screen on a display of the handheld electronic device in a portrait screen orientation when the screen orientation is a portrait screen orientation, wherein the first user interface screen comprises an album list; and (iii) displaying a second user interface screen on the display of the handheld electronic device in a landscape screen orientation when the screen orientation is a landscape screen orientation, wherein the second user interface screen comprises an array of album art images arranged in rows and columns.

27 Claims, 12 Drawing Sheets

Related U.S. Application Data continuation of application No. 12/498,627, filed on Jul. 7, 2009, now Pat. No. 8,245,143.

(60) Provisional application No. 61/103,744, filed on Oct. 8, 2008.

(51) Int. Cl.

| | | |
|---|---|---|
| *G06F 1/16* | (2006.01) | |
| *G06F 3/0481* | (2013.01) | |
| *G06F 3/0488* | (2013.01) | |
| *G06F 3/01* | (2006.01) | |
| *G06F 3/0484* | (2013.01) | |
| *G06F 3/0483* | (2013.01) | |
| *H04M 1/725* | (2006.01) | |

(52) U.S. Cl.
CPC ...... *G06F 3/04817* (2013.01); *G06F 3/04886* (2013.01); *G06F 3/0481* (2013.01); *G06F 3/0483* (2013.01); *G06F 3/0484* (2013.01); *G06F 2200/1614* (2013.01); *G06F 2200/1637* (2013.01); *H04M 1/72583* (2013.01); *H04M 2250/22* (2013.01)

(58) Field of Classification Search
CPC .... G06F 3/0484; G06F 3/0483; G06F 3/0481; G06F 2200/1614; G06F 2200/1637; H04M 1/72583; H04M 2250/22
USPC .......................................................... 715/744
See application file for complete search history.

(56) References Cited

U.S. PATENT DOCUMENTS

| | | | |
|---|---|---|---|
| 2004/0220723 A1* | 11/2004 | Gould Bear | G06F 3/023 701/532 |
| 2004/0223004 A1 | 11/2004 | Lincke et al. | |
| 2005/0154798 A1 | 7/2005 | Nurmi | |
| 2005/0183021 A1 | 8/2005 | Allen et al. | |
| 2006/0109242 A1 | 5/2006 | Simpkins | |
| 2006/0176278 A1 | 8/2006 | Mathews et al. | |
| 2006/0195790 A1* | 8/2006 | Beaupre | G06F 17/30766 715/727 |
| 2007/0083827 A1 | 4/2007 | Scott et al. | |
| 2007/0162876 A1 | 7/2007 | Quirk | |
| 2007/0174782 A1 | 7/2007 | Russo | |
| 2008/0016465 A1 | 1/2008 | Foxenland | |
| 2008/0034039 A1* | 2/2008 | Cisler | G06F 3/0483 709/204 |
| 2008/0066016 A1* | 3/2008 | Dowdy | G06F 17/30749 715/854 |
| 2008/0094421 A1 | 4/2008 | Maeda | |
| 2008/0165152 A1 | 7/2008 | Forstall et al. | |
| 2008/0174597 A1 | 7/2008 | Takagi | |
| 2009/0002335 A1 | 1/2009 | Chaudhri | |
| 2009/0037846 A1 | 2/2009 | Spalink et al. | |
| 2009/0064055 A1 | 3/2009 | Chaudhri et al. | |
| 2009/0178008 A1 | 7/2009 | Herz et al. | |
| 2009/0204925 A1 | 8/2009 | Bhat et al. | |
| 2009/0319949 A1 | 12/2009 | Dowdy et al. | |
| 2010/0023883 A1 | 1/2010 | Khazaka et al. | |
| 2010/0066763 A1 | 3/2010 | Macdougall et al. | |
| 2010/0087230 A1 | 4/2010 | Peh et al. | |
| 2010/0088630 A1 | 4/2010 | Morris | |
| 2012/0216139 A1 | 8/2012 | Ording et al. | |

OTHER PUBLICATIONS

Office Action; CA application No. 2681291; dated Mar. 25, 2013.
Enterra-Soft, Icon Keeper Deluxe-Keeping icon positions on desktop; Website: http://www.enterra-soft.com/products/iconkeeperdeluxe/index.shtml; 2004-2007, U.S.A.
Bangeman, The iPod meets the iPhone: a review of the iPod touch, Website: http://arstechnica.com/apple/reviews/2007/09/The-iPod-meets-the-iPhone-a-review-of-the-iPod-touch.ars/4, Sep. 17, 2007.
Haine, The iPod touch is not a great media player, Website: at http://stealthisidea.com/articles/the-ipod-touch-is-not-a-great-media-player/; 2005-2008.
Samer, Save and Restore your desktop icon positions with "Shock Desktop", Website: http://www.freewaregenius.com/2007/12/19/save-and-restore-you-desktop-icon-positions-with-shock-desktop/, 2007-2008.
EESR from Corresponding EP Patent Application No. 09164711.5 dated Nov. 26, 2009.
Communication Pursuant to Article 94(3); EP 09164711.5 dated Oct. 13, 2011.
Office Action; CA Application No. 2681291 dated Mar. 28, 2012.
Office Action; U.S. Appl. No. 13/548,538 dated Dec. 23, 2014.
Office Action; U.S. Appl. No. 13/548,538 dated Nov. 27, 2013.
Final Office Action; U.S. Appl. No. 13/548,538 dated Jun. 19, 2015.
Final Office Action; U.S. Appl. No. 13/548,538 dated May 9, 2014.
Advisory Action; U.S. Appl. No. 13/548,538 dated Aug. 18, 2015.
Advisory Action; U.S. Appl. No. 13/548,538 dated Jul. 17, 2014.

* cited by examiner

Top up Device Orientation

Bottom up Device Orientation

Left up Device Orientation

Right up Device Orientation

Front up Device Orientation

Back up Device Orientation

METHOD AND HANDHELD ELECTRONIC DEVICE HAVING A GRAPHICAL USER INTERFACE WHICH ARRANGES ICONS DYNAMICALLY

RELATED APPLICATION DATA

The present application is a continuation of non-provisional U.S. patent application Ser. No. 13/548,538, filed Jul. 13, 2012, which is a continuation of non-provisional U.S. patent application Ser. No. 12/498,627, filed Jul. 7, 2009, which claims priority to and the benefit of provisional U.S. patent application No. 61/103,744, filed Oct. 8, 2008. The content of these documents is incorporated herein by reference.

TECHNICAL FIELD

The present disclosure relates generally to a user interfaces, and in particular to a method and handheld electronic device having a graphical user interface which arranges icons dynamically.

BACKGROUND

Handheld electronic devices, such as mobile communication devices, provide a number of features and applications including, for example, a phone application, media player application, mapping application, calendar application, email application, instant messaging (IM) application, text messaging application (e.g., for sending and receiving short message service (SMS) messages), and other applications. Navigation between the various features and applications of handheld electronic devices is often provided by way of graphical user interfaces (GUIs) having an icon menu. Any feature, operation, command, function or application can be represented by an icon in the icon menu. However, handheld electronic devices have relative small display screens and there are often more icons to be displayed than there is space to display them. While icons may be decreased in size, this option is limited to the extent that the icons must remain readable to the device user.

GUIs sometimes may provide limited customization of the displayed icons, typically being limited to the size of the icons and the selection of which icons are displayed and which are hidden. Some handheld electronic devices with expandable user interface screens having content which extends beyond the virtual boundary of the display screen provide for the icons displayed on the main screen of the expandable user interface screens to be configurable by the user in order to limit scrolling/expanding. However, there remains a need for improved graphical user interfaces which organize displayed icons and associated application information.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
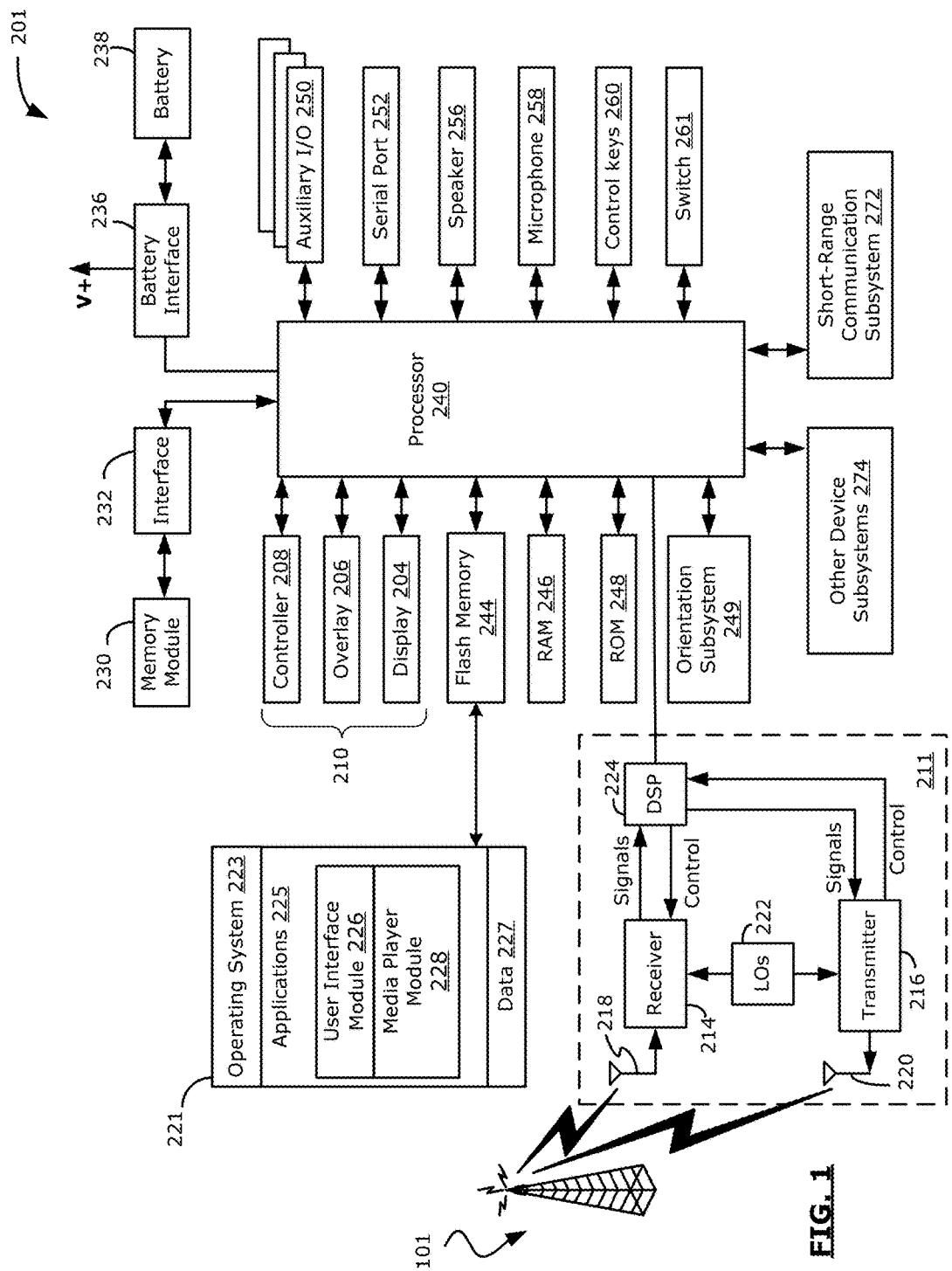
FIG. 1 is a block diagram illustrating a mobile communication device in accordance with one example embodiment of the present disclosure.

The embodiments described herein generally relate to portable electronic devices. Examples of portable electronic devices include mobile (wireless) communication devices such as pagers, cellular phones, Global Positioning System (GPS) navigation devices and other satellite navigation devices, smartphones, wireless organizers, personal digital assistants and wireless-enabled notebook computers. At least some of these portable electronic devices may be handheld electronic devices. The portable electronic device may be a portable electronic device without wireless communication capabilities such as a handheld electronic game device, digital photograph album, digital camera and video recorder such as a camcorder. The portable electronic devices could have a touchscreen display, a mechanical keyboard in addition to a touchscreen display, or a conventional non-touchscreen display with a mechanical keyboard. These examples are intended to be non-limiting.

The present disclosure provides a graphical user interface (GUI) which arranges icons in accordance with the screen orientation of the GUI and changes in the screen orientation. The screen orientation of the GUI may be changed in response to a change in device orientation detected by an orientation sensor of the device, or possibly in response to respective input from the device user.

In accordance with one embodiment of the present disclosure, there is provided a method for providing a graphical user interface (GUI) for a media player application of a handheld electronic device, the method comprising: (i) determining a screen orientation of the GUI in accordance with a device orientation of the handheld electronic device; (ii) displaying a first user interface screen on a display of the handheld electronic device in a portrait screen orientation when the screen orientation is a portrait screen orientation, wherein the first user interface screen comprises an album list; and (iii) displaying a second user interface screen on the display of the handheld electronic device in a landscape screen orientation when the screen orientation is a landscape screen orientation, wherein the second user interface screen comprises an array of album art images arranged in rows and columns.

In accordance with another embodiment of the present disclosure, there is provided a method for providing an icon menu with dynamic icon arrangement within a GUI displayed on a display of a handheld electronic device, the method comprising: determining a screen orientation of the GUI in accordance with a device orientation; displaying a first user interface screen in a portrait screen orientation when a screen orientation of the GUI is a portrait screen orientation, the first user interface screen comprising a reduced icon menu having a plurality of icons arranged in an array of rows and columns and an input area adjacent to the reduced icon menu; and displaying a second user interface screen in a landscape screen orientation when the screen orientation of the GUI is a landscape screen orientation, the second user interface screen comprising a first expanded icon menu having a plurality of icons arranged in an array of rows and columns, wherein the first expanded icon menu includes the array of icons of the reduced icon menu and one or more additional rows of icons, wherein the first expanded icon menu is larger than the reduced icon menu.

In accordance with a further embodiment of the present disclosure, there is provided a handheld electronic device, comprising: a controller; a display coupled to the controller; an orientation sensor connected to the controller for generating an orientation signal in dependence on the orientation of the handheld electronic device; a memory connected to the controller, the memory having stored thereon a user interface module for generating a graphical user interface on the display screen; wherein the controller is configured by the user interface module to performing the method(s) set forth herein.

In accordance with yet a further embodiment of the present disclosure, there is provided a non-transitory machine readable medium having tangibly stored thereon executable instructions for execution by a controller of a handheld electronic device, wherein the executable instructions, when executed by the controller of the handheld electronic device, cause the handheld electronic device to performing the method(s) set forth herein.

Mobile Communication Device

Reference is now made to FIG. 1 which illustrates a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. Depending on the functionality provided by the mobile communication device 201, in various embodiments the device may be a data communication device, a multiple-mode communication device configured for both data and voice communication, a smartphone, a mobile telephone or a PDA (personal digital assistant) enabled for wireless communication, or a computer system with a wireless modem.

The mobile communication device 201 includes a controller comprising at least one processor 240 such as a microprocessor which controls the overall operation of the mobile communication device 201, and a wireless communication subsystem 211 for exchanging radio frequency signals with the wireless network 101. The processor 240 interacts with the communication subsystem 211 which performs communication functions. The processor 240 interacts with additional device subsystems including a display screen 204, such as a liquid crystal display (LCD) screen, with a touch-sensitive input surface or overlay 206 connected to an electronic controller 208 that together make up a touchscreen display 210. The touch-sensitive overlay 206 and the electronic controller 208 provide a touch-sensitive input device and the processor 240 interacts with the touch-sensitive overlay 206 via the electronic controller 208. The device 201 could include other input devices such as a keyboard or keypad, navigational tool (input device), or both. The navigational tool could be a clickable/depressible trackball or scrollwheel. The other input devices could be included in addition to, or instead of, the touchscreen display 210.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, control keys 260, switch 261, short-range communication subsystem 272, an orientation subsystem 249 and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile communication device 201 and a single antenna may be shared by both receiver and transmitter, as is known in the art. As will be apparent to those skilled in the field of communication, the particular design of the communication subsystem 211 depends on the wireless network 101 in which mobile communication device 201 is intended to operate.

The mobile communication device 201 may communicate with any one of a plurality of fixed transceiver base stations 108 (FIG. 12) of the wireless network 101 within its geographic coverage area. The mobile communication device 201 may send and receive communication signals over the wireless network 101 after a network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 1, the software modules 221 comprise operating system software 223, software applications 225 comprising a user interface module 226 and a media player module 228 for providing a media player application. The user interface module 226 renders and displays the GUI of the device 201 in accordance with instructions of the operating system 223 and applications 225 (as applicable).

The modules 226, 228 may, among other things, each be implemented through standalone software applications, or combined together in one or more of the operating system 223 or other software applications 225. The functions performed by each of the above identified modules 226, 228 may be realized as a plurality of independent elements, rather than a single integrated element, and any one or more of these elements may be implemented as parts of other software applications 225.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may include a range of applications, including, for example, an address book application, a messaging application, a calendar application, and/or a notepad application. In some embodiments, the software applications 225 include an email message application, a push content viewing application, a voice communication (i.e. telephony) application and a map application. Each of the software applications 225 may include layout information defining the placement of particular fields and graphic elements (e.g. text fields, input fields, icons, etc.) in the user interface (i.e. the display device 204) according to the application.

In some embodiments, the auxiliary I/O subsystems 250 may comprise an external communication link or interface, for example, an Ethernet connection. The mobile communication device 201 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a vibrator for providing vibratory notifications in response to various events on the mobile communication device 201 such as receipt of an electronic communication or incoming phone call, or for other purposes such as haptic feedback (touch feedback).

In some embodiments, the mobile communication device 201 also includes a removable memory card 230 (typically comprising flash memory) and a memory card interface 232. Network access may be associated with a subscriber or user of the mobile communication device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile communication device 201 in order to operate in conjunction with the wireless network 101.

The mobile communication device 201 stores data 240 in an erasable persistent memory, which in one example embodiment is the flash memory 244. In various embodiments, the data 240 includes service data comprising information required by the mobile communication device 201 to establish and maintain communication with the wireless network 101. The data 240 may also include user application data such as email messages, address book and contact information, calendar and schedule information, notepad documents, image files, and other commonly stored user information stored on the mobile communication device 201 by its user, and other data. The data 240 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

In some embodiments, the mobile communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer system for processing.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 223 or software applications 225 may also be loaded onto the mobile communication device 201 through the wireless network 101, the auxiliary I/O subsystem 250, the serial port 252, the short-range communication subsystem 272, or other suitable subsystem 274 other wireless communication interfaces. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 242. A user of the mobile communication device 201 may also compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a voice call, or other voice call related information.

Figure 2:
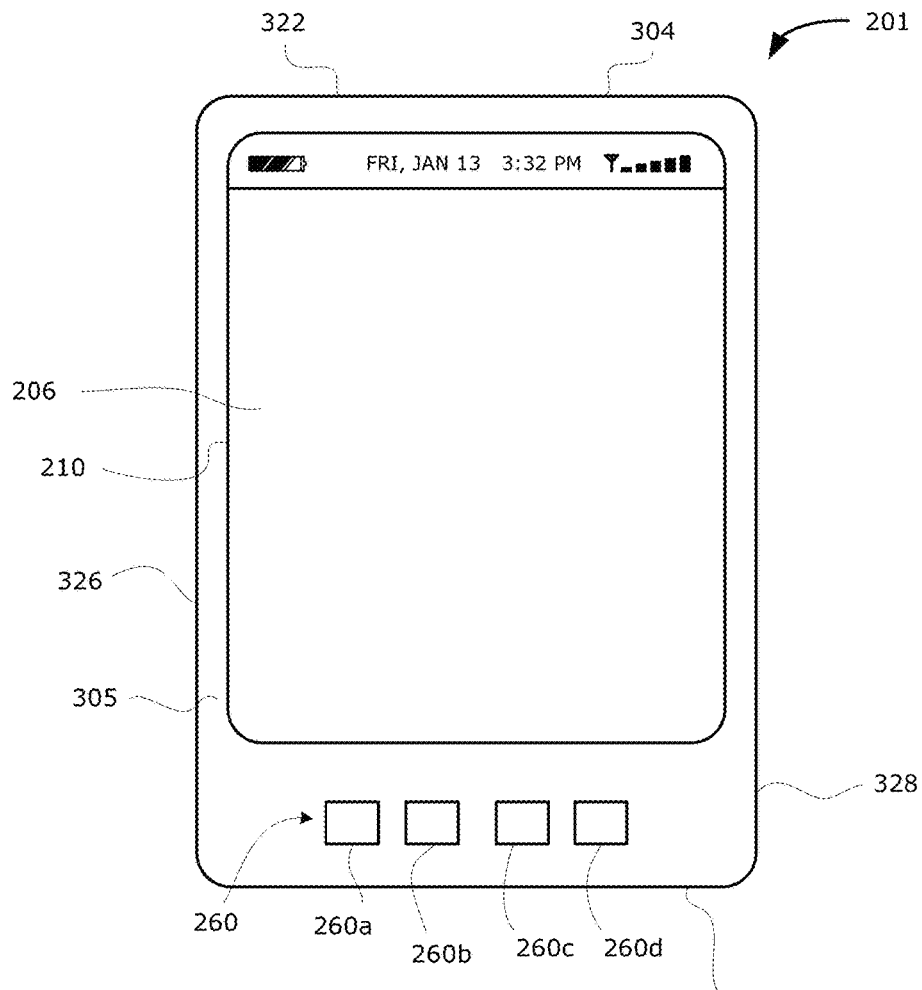
FIG. 2 is a front view of the mobile communication device of FIG. 1 in accordance with one example embodiment of the present disclosure.
Figure 3:
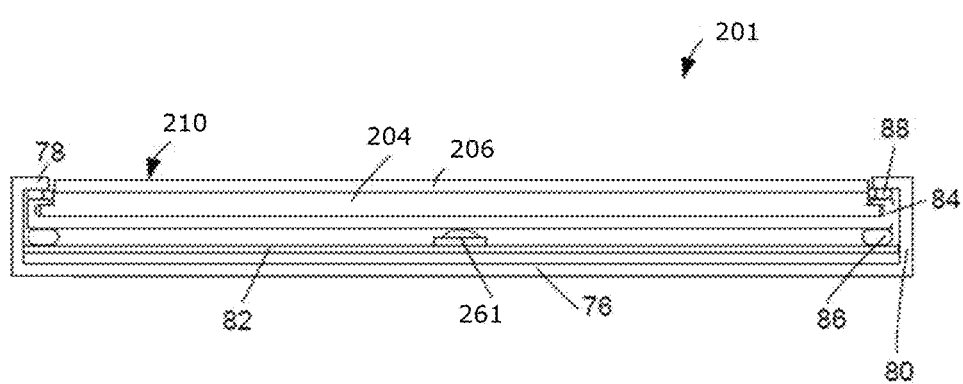
FIG. 3 is a simplified sectional view of the mobile communication device of FIG. 1 with the switch shown in a rest position.

Referring now to FIGS. 2 and 3, the construction of the device 201 will be described in more detail. The device 201 includes a rigid case 304 for housing the components of the device 201 that is configured to be held or cradleable in a user's hand while the device 201 is in use. The touchscreen display 210 is mounted within a front face 305 of the case 304 so that the case 304 frames the touchscreen display 210 and exposes it for user-interaction therewith. The case 304 has opposed top and bottom ends designated by references 322, 324 respectively, and left and right sides designated by references 326, 328 respectively which extend transverse to the top and bottom ends 322, 324. In the shown embodiments of FIGS. 2 and 3, the case 304 (and device 201) is elongate having a length, defined between the top and bottom ends 322, 324, longer than a width, defined between the left and right sides 326, 328. Other device dimensions and form factors are also possible.

As further illustrated in FIG. 3, the case 304 includes a back 76, a frame 78 which frames the touch-sensitive display 210, sidewalls 80 that extend between and are generally perpendicular to the back 76 and the frame 78, and a base 82 that is spaced from and generally parallel to the back 76. The base 82 can be any suitable base and can include, for example, a printed circuit board or flex circuit board (not shown). The back 76 includes a plate (not shown) that is releasably attached for insertion and removal of, for example, the battery 238 and the memory module 230 described above. It will be appreciated that the back 76, the sidewalls 80 and the frame 78 can be injection molded, for example.

The display device 204 and the overlay 206 can be supported on a support tray 84 of suitable material such as magnesium for providing mechanical support to the display device 204 and overlay 206. The display device 204 and overlay 206 are biased away from the base 82, toward the frame 78 by biasing elements 86 such as gel pads between the support tray 84 and the base 82. Compliant spacers 88 which, for example, can also be in the form of gel pads are located between an upper portion of the support tray 84 and the frame 78. The touchscreen display 210 is moveable within the case 304 as the touchscreen display 210 can be moved toward the base 82, thereby compressing the biasing elements 86. The touchscreen display 210 can also be pivoted within the case 304 with one side of the touchscreen display 210 moving toward the base 82, thereby compressing the biasing elements 86 on the same side of the touchscreen display 210 that moves toward the base 82.

In the example embodiment, the switch 261 is supported on one side of the base 82 which can be a printed circuit board while the opposing side provides mechanical support and electrical connection for other components (not shown) of the device 201. The switch 261 can be located between the base 82 and the support tray 84. The switch 261, which can be a mechanical dome-type switch (or in other example embodiments a plurality of mechanical dome-type switches), for example, can be located in any suitable position such that displacement of the touchscreen display 210 resulting from a user pressing the touchscreen display 210 with sufficient force to overcome the bias and to overcome the actuation force for the switch 261, depresses and actuates the switch 261. In the present example embodiment the switch 261 is in contact with the support tray 84. Thus, depression of the touchscreen display 210 by application of a force thereto, causes actuation of the switch 261, thereby providing the user with a positive tactile quality during user interaction with the user interface of the 201. The switch 261 is not actuated in the rest position shown in FIG. 4, absent applied force by the user. It will be appreciated that the switch 261 can be actuated by pressing anywhere on the touchscreen display 210 to cause movement of the touchscreen display 210 in the form of movement parallel with the base 82 or pivoting of one side of the touchscreen display 210 toward the base 82. The switch 261 is connected to the processor 240 and can be used for further input to the processor when actuated. Although a single switch is shown any suitable number of switches can be used.

The touchscreen display 210 can be any suitable touchscreen display such as a capacitive touchscreen display. A capacitive touchscreen display 210 includes the display device 204 and the touch-sensitive overlay 206, in the form of a capacitive touch-sensitive overlay 206. It will be appreciated that the capacitive touch-sensitive overlay 206 includes a number of layers in a stack and is fixed to the display device 204 via a suitable optically clear adhesive. The layers can include, for example a substrate fixed to the display device 204 (e.g. LCD display) by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

Figure 4:
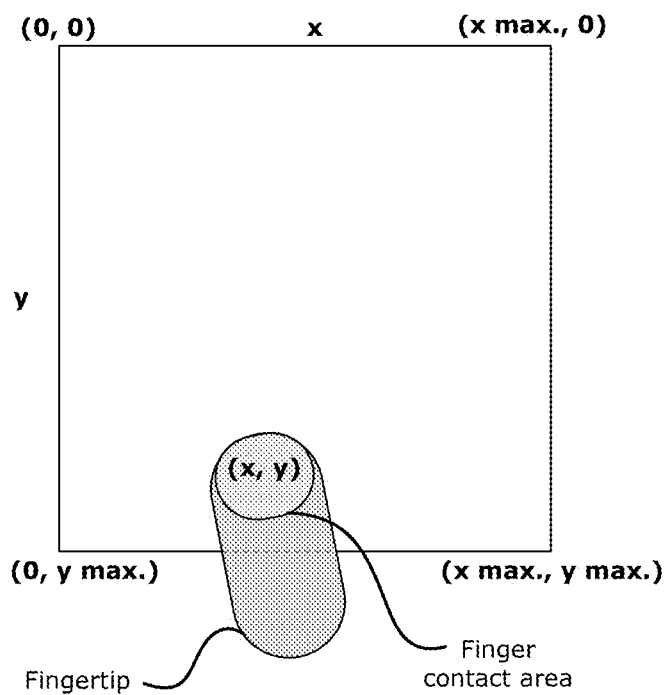
FIG. 4 illustrates a Cartesian dimensional coordinate system of a touchscreen which map locations of touch signals in accordance with one example embodiment of the present disclosure.

Referring now to FIG. 4 together with FIG. 1, each of the touch sensor layers comprises an electrode layer each having a number of spaced apart transparent electrodes. The electrodes may be a patterned vapour-deposited ITO layer or ITO elements. The electrodes may be, for example, arranged in an array of spaced apart rows and columns. As shown in FIG. 4, the touch sensor layers/electrode layers are each associated with a coordinate (e.g., x or y) in a coordinate system used to map locations on the touchscreen display 210, for example, in Cartesian coordinates (e.g., x and y-axis coordinates). The intersection of the rows and columns of the electrodes may represent pixel elements defined in terms of an (x, y) location value which can form the basis for the coordinate system. Each of the touch sensor layers provide a signal to the controller 208 (FIG. 1) which represent the respective x and y coordinates of the touchscreen display 210. That is, x locations are provided by a signal generated by one of the touch sensor layers and y locations are provided by a signal generated by the other of the touch sensor layers.

The electrodes in the touch sensor layers/electrode layers respond to changes in the electric field caused by conductive objects in the proximity of the electrodes. When a conductive object is near or contacts the touch-sensitive overlay 206, the object draws away some of the charge of the electrodes and reduces its capacitance. The controller 208 receives signals from the touch sensor layers of the touch-sensitive overlay 206, detects touch events by determining changes in capacitance which exceed a predetermined threshold, and determines the centroid of a contact area defined by electrodes having a change in capacitance which exceeds the predetermined threshold, typically in x, y (Cartesian) coordinates.

The controller 208 sends the centroid of the contact area to the processor 240 of the device 201 as the location of the touch event detected by the touchscreen display 210. Depending on the touch-sensitive overlay 206 and/or configuration of the touchscreen display 210, the change in capacitance which results from the presence of a conductive object near the touch-sensitive overlay 206 but not contact the touch-sensitive overlay 206, may exceed the predetermined threshold in which case the corresponding electrode would be included in the contact area. The detection of the presence of a conductive object such as a user's finger or a conductive stylus is sometimes referred to as finger presence/stylus presence.

It will be appreciated that other attributes of a touch event on the touchscreen display 210 can be determined. For example, the size and the shape (or profile) of the touch event on the touchscreen display 210 can be determined in addition to the location based on the signals received at the controller 208 from the touch sensor layers. For example, the touchscreen display 210 may be used to create a pixel image of the contact area created by a touch event. The pixel image is defined by the pixel elements represented by the intersection of electrodes in the touch sensor layers/electrode layers. The pixel image may be used, for example, to determine a shape or profile of the contact area.

The centroid of the contact area is calculated by the controller 208 based on raw location and magnitude (e.g., capacitance) data obtained from the contact area. The centroid is defined in Cartesian coordinates by the value ($X_c$, $Y_c$). The centroid of the contact area is the weighted averaged of the pixels in the contact area and represents the central coordinate of the contact area. By way of example, the centroid may be found using the following equations:

$$X_c = \frac{\sum_{i=1}^{n} Z_i * x_i}{\sum_{i=1}^{n} Z_i} \quad (1)$$

$$Y_c = \frac{\sum_{i=1}^{n} Z_i * y_i}{\sum_{i=1}^{n} Z_i} \quad (2)$$

where $X_c$ represents the x-coordinate of the centroid of the contact area, $Y_c$ represents the y-coordinate of the centroid of the contact area, x represents the x-coordinate of each pixel in the contact area, y represents the y-coordinate of each pixel in the contact area, Z represents the magnitude (capacitance value or resistance) at each pixel in the contact area, the index i represents the electrodes in the contact area and n represents the number of electrodes in the contact area. Other methods of calculating the centroid will be understood to persons skilled in the art.

The controller 208 of the touchscreen display 210 is typically connected using both interrupt and serial interface ports to the processor 240. In this way, an interrupt signal which indicates a touch event has been detected, the centroid of the contact area, as well as raw data regarding the location and magnitude of the activated electrodes in the contact area are passed to the processor 240. However, in other example embodiments only an interrupt signal which indicates a touch event has been detected and the centroid of the contact area are passed to the processor 240. In embodiments where the raw data is passed to the processor 240, the detection of a touch event (i.e., the application of an external force to the touch-sensitive overlay 206) and/or the determination of the centroid of the contact area may be performed by the processor 240 of the device 201 rather than the controller 208 of the touchscreen display 210.

In other embodiments, the touchscreen display 210 may be a display device, such as an LCD screen, having the touch-sensitive input surface (overlay) 206 integrated therein. One example of such a touchscreen is described in commonly owned U.S. patent publication no. 2004/0155991, published Aug. 12, 2004 (also identified as U.S. patent application Ser. No. 10/717,877, filed Nov. 20, 2003) which is incorporated herein by reference.

While a specific embodiment of the touchscreen display 210 has been described, any suitable type of touchscreen may be used in the handheld electronic device of the present disclosure including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the handheld electronic device and its particular application and demands.

Referring again to FIG. 4, a Cartesian (two dimensional) coordinate system used to map locations of the touchscreen display 210 in accordance with one embodiment of the present disclosure will be described. The touchscreen display 210 defines a Cartesian coordinate system defined by x and y-axes in the input plane of the touchscreen display 210. Each touch event on the touchscreen display 210 returns a touch point defined in terms of an (x, y) value. The returned touch point is typically the centroid of the contact area.

In the shown embodiment, the touchscreen display 210 has a rectangular touch-sensitive overlay 206; however, in other embodiments, the touch-sensitive overlay 206 could have a different shape such as a square shape. The rectangular touch-sensitive overlay 206 results in a screen which is divided into a rectangular array of pixels with positional values ranging from 0 to the maximum in each of the x and y-axes (x max. and y max. respectively). The x-axis extends in the same direction as the width of the device 201 and the touch-sensitive overlay 206. The y-axis extends in the same direction as the length of the device 201 and the touch-sensitive overlay 206.

The coordinate system has an origin (0, 0) which is located at the top left-hand side of the touchscreen display 210. For purposes of convenience, the origin (0, 0) of the Cartesian coordinate system is located at this position in all of the embodiments described in the present disclosure. However, it will be appreciated that in other embodiments the origin (0, 0) could be located elsewhere such as at the bottom left-hand side of the touchscreen display 210, the top right-hand side of the touchscreen display 210, or the bottom right-hand side of the touchscreen display 210. The location of the origin (0, 0) could be configurable in other embodiments.

During operation, a graphical user interface (GUI) for controlling the operation of the device 201 may be displayed on the touchscreen display 210. The GUI is rendered prior to display by the operating system 223 or an application 225 which causes the processor 240 to display content on the touchscreen display 210. The GUI of the device 201 has a screen orientation (also referred to as a screen mode) in which the text and user interface elements of the GUI are oriented for normal viewing. It will be appreciated that the screen orientation for normal viewing is independent of the language supported. That is, the screen orientation for normal viewing is the same regardless of whether a row-oriented language or column-oriented language (such as Asian languages) is displayed within the GUI. Direction references in relation to the GUI, such as top, bottom, left, and right, are relative to the current screen orientation of the GUI rather than the device 201 or its case 304.

In embodiments such as that shown in FIGS. 2 and 4 in which the display screen is rectangular in shape, the screen orientation is either portrait (vertical) or landscape (horizontal). A portrait screen orientation is a screen orientation in which the text and other user interface elements extend in a direction transverse (typically perpendicular) to the length (y-axis) of the display screen. A landscape screen orientation is a screen orientation in which the text and other user interface elements extend in a direction transverse (typically perpendicular) to the width (x-axis) of the display screen. That is, in the portrait screen orientation icons and text are typically oriented so that they may be read when the touchscreen display 210 is oriented in a manner in which its width is less than its height (such as the orientation in FIG. 2) In the landscape screen orientation, icons and text are typically oriented so that they may be read when the touchscreen display 210 is oriented in a manner in which its width is greater than its height (i.e., when the device 201 of FIG. 2 is rotated 90°). In some embodiments, the GUI of the device 201 changes its screen orientation between a portrait screen orientation and landscape screen orientation in accordance with changes in device orientation.

Referring to FIG. 1, the mobile communication device 201 also comprises a device orientation subsystem 249 comprising at least one orientation sensor which is connected to the processor 240 and which is controlled by one or a combination of a monitoring circuit and operating software. The device orientation subsystem 249 may comprise two or more orientation sensors or an orientation sensor and an electronic compass. The device orientation subsystem 249 detects the orientation of the mobile communication device 201 or detects information from which the orientation of the mobile communication device 201 can be determined, such as acceleration using an accelerometer. In other embodiments, an orientation sensor other than an accelerometer could be used, such as a gravity sensor, a gyroscope, a tilt sensor, an electronic compass, or other suitable sensor, or combinations thereof.

As will be appreciated by persons skilled in the art, an accelerometer is a sensor which converts acceleration from motion (e.g. movement of the mobile communication device 201 or a portion thereof due to the strike force) and gravity which are detected by a sensing element into an electrical signal (producing a corresponding change in output) and is available in one, two or three axis configurations. Accelerometers may produce digital or analog output signals depending on the type of accelerometer. Generally, two types of outputs are available depending on whether an analog or digital accelerometer used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface. The output of an accelerometer is typically measured in terms of the gravitational acceleration constant at the Earth's surface, denoted g, which is approximately 9.81 m/s² (32.2 ft/s²) as the standard average. The accelerometer may be of almost any type including, but not limited to, a capacitive, piezoelectric, piezoresistive, or gas-based accelerometer. The range of accelerometers vary up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland.

Figure 5:
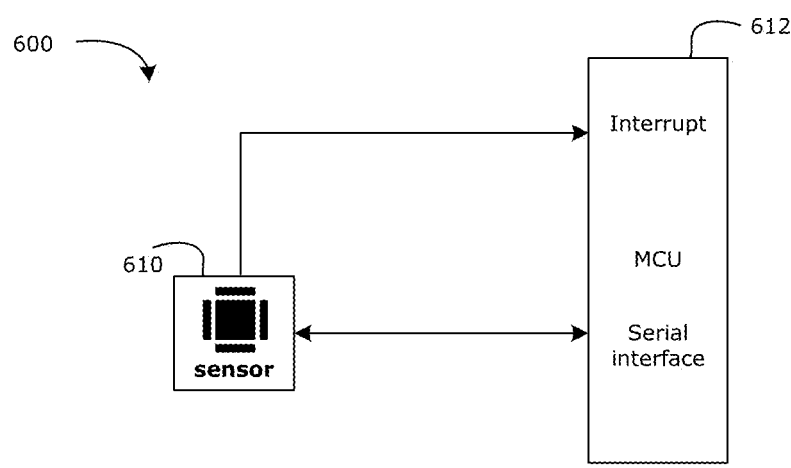
FIG. 5 is a block diagram of a device orientation detection subsystem comprising a digital three-axis accelerometer in accordance with one example embodiment of the present disclosure.

Referring briefly to FIG. 5, a device orientation subsystem 246 in accordance with one example embodiment of the present disclosure will be described. The circuit 600 comprises a digital 3-axis accelerometer 610 connected to the interrupt and serial interface of a controller (MCU) 612. The controller 612 could be the processor 240 (FIG. 1) of the device 201. The operation of the controller 612 is controlled by software, which may be stored in internal memory of the controller 612. The operational settings of the accelerometer 610 are controlled by the controller 612 using control signals sent from the controller 612 to the accelerometer 610 via the serial interface. The controller 612 may determine the device orientation in accordance with the acceleration measured by the accelerometer 610, or raw acceleration data measured by the accelerometer 610 may be sent to the processor 240 (FIG. 1) of the device 201 via its serial interface where device orientation is determined by the operating system 223, or other software module 221. In other embodiments, a different digital accelerometer configuration could be used, or a suitable analog accelerometer and control circuit could be used.

Figure 6:
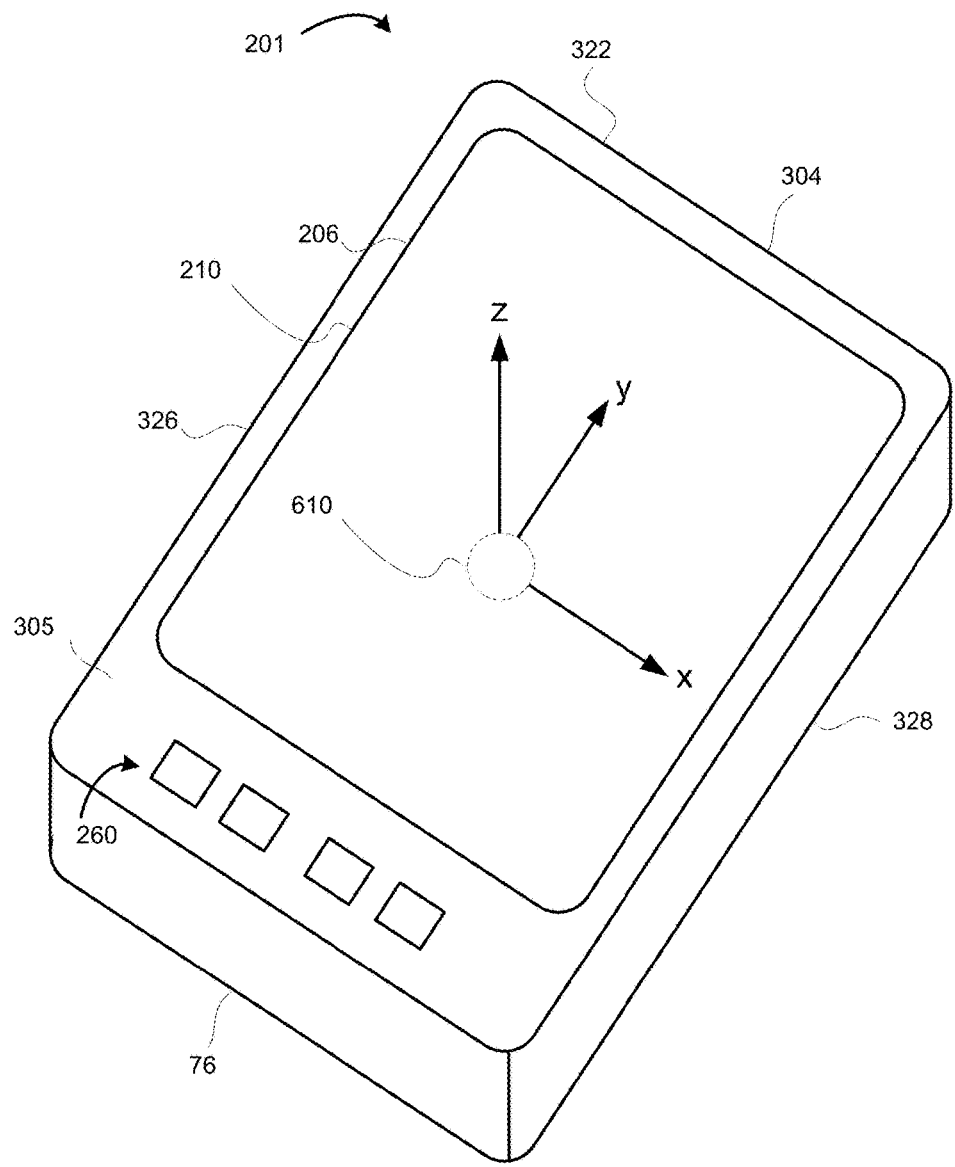
FIG. 6 is a perspective view of the mobile communication device of FIG. 1 with a three-axis accelerometer mounted therein in accordance with one example embodiment of the present disclosure.

The device orientation subsystem 249 may include a three-axis accelerometer 610 having x, y and z sensing axes. As shown in FIG. 6, the sensing axes x, y, z may be aligned with the form factor of the device 201. In some embodiments, the accelerometer 610 is aligned such that a first sensing axis x extends longitudinally along the midpoint of the handheld electronic device 201 between left 326 and right 328 sides of the device 201, a second sensing axis y extends laterally along the midpoint of the device 201 between top 322 and bottom ends 324, and a third sensing axis z extends perpendicularly through the x-y plane defined by the x and y axes at the intersection (origin) of these axes. It is contemplated that the sensing axes x, y, z may be aligned with different features of the device 201 in other embodiments.

Figure 7C:
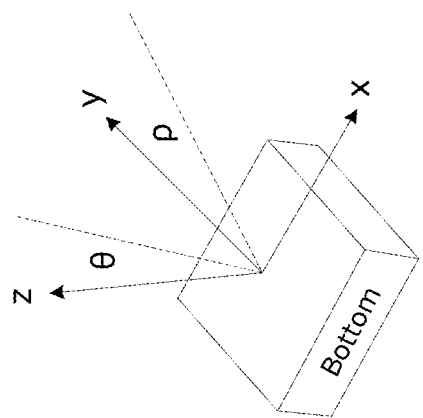
FIGS. 7A to 7C are schematic diagrams illustrating the assignment of pitch and roll vectors of a three-axis accelerometer in accordance with one example embodiment of the present disclosure.
Figure 7B:
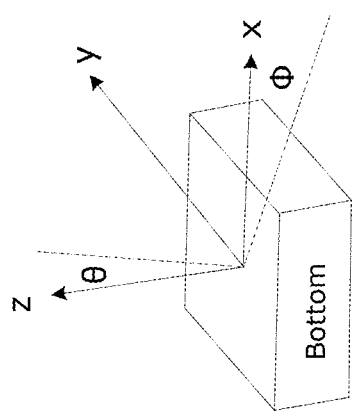
Figure 7A:
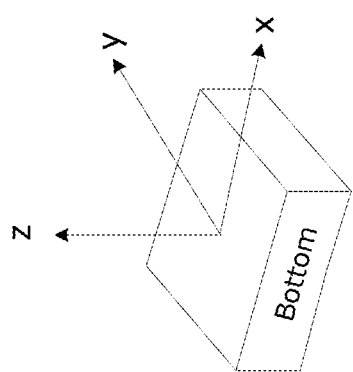

Referring now to FIGS. 7A to 7C, the assignment of pitch and roll vectors of a three-axis accelerometer in accordance with one example embodiment of the present disclosure will be briefly described. Each sensing axis is aligned with an axis of the mobile communication device 201. As discussed above, the x axis and y axis are typically aligned with the input plane of the touchscreen display 210. The z-axis is perpendicular to the horizontal plane and detects when the mobile communication device 201 is moved vertically.

As shown in FIG. 7B, pitch (Φ) is the angle of the x-axis relative to the ground. θ is the angle of the z-axis relative to gravity. As shown in FIG. 7C, roll (ρ) is the angle of the y-axis relative to the ground. It will be appreciated that rotation may occur about any combination of sensing axes. The concepts and methodology described herein can be applied to any axis orientation and any combination of pitch (Φ) angle, roll (ρ) angle and θ (the angle of the z-axis relative to gravity). Pitch (Φ), roll (ρ) and the angle of the z-axis relative to gravity (θ) of a three-axis accelerometer may be calculated using equations (3), (4) and (5):

$$\varphi = \arctan \frac{x_{sensor}}{\sqrt{y_{sensor}^2 + z_{sensor}^2}} \quad (3)$$

$$\rho = \arctan \frac{y_{sensor}}{\sqrt{x_{sensor}^2 + z_{sensor}^2}} \quad (4)$$

$$\theta = \arctan \frac{\sqrt{x_{sensor}^2 + y_{sensor}^2}}{z_{sensor}} \quad (5)$$

where $x_{sensor}$, $y_{sensor}$ and $z_{sensor}$ are the measurements from the x, y and z-axes of the three-axis accelerometer. It will be appreciated that pitch (Φ), roll (ρ) and the angle of the z-axis relative to gravity (θ) can also be determined by other means.

Figure 8A:
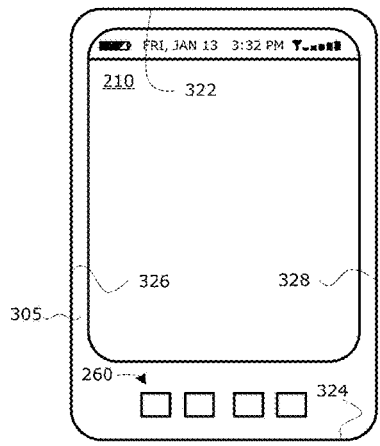
FIGS. 8A to 8F illustrate six (6) device orientations recognized by a device orientation subsystem of the handheld electronic device in accordance with one example embodiment of the present disclosure.
Figure 8B:
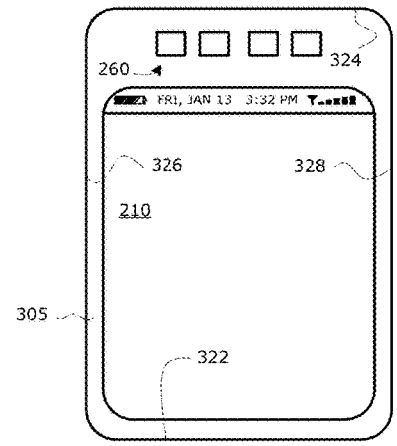
Figure 8C:
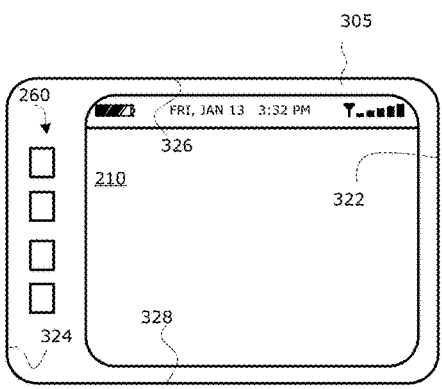
Figure 8D:
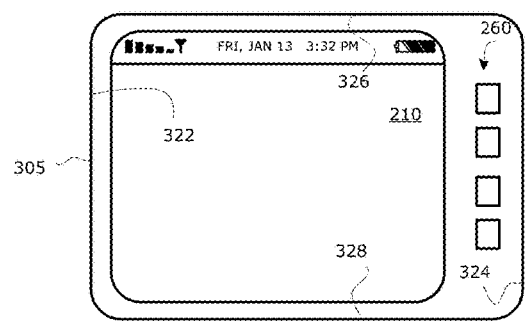
Figure 8E:
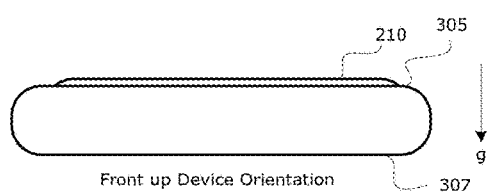
Figure 8F:
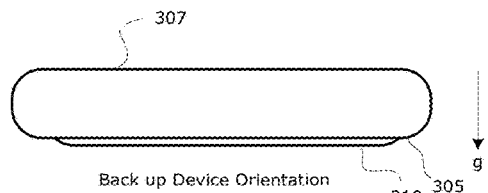

The device 201 includes a user interface module 226 (shown in FIG. 1) which uses input from the device orientation subsystem 249 to select and update the screen orientation of the GUI presented within the touchscreen display 210 in accordance with the device orientation, amongst other inputs. Referring now to FIG. 8A to 8F, predefined device orientations used by the user interface module 226 in some embodiments of the present disclosure will be described. The device orientation subsystem 249 or processor 240, depending on the embodiment, uses measurements of the device orientation subsystem 249 (e.g., the accelerometer) to determine the device orientation to be one of six possible device orientations comprising: (1) a "top up" device orientation (as shown in FIG. 8A); (2) a "bottom up" device orientation (as shown in FIG. 8B); (3) a "left up" device orientation (as shown in FIG. 8C); (4) a "right up" device orientation (as shown in FIG. 8D); (5) a "front up" (or "face up") device orientation (as shown in FIG. 8E); and (6) a "back up" device orientation (as shown in FIG. 8F). Other device orientations are possible and could be used in other embodiments.

It will be appreciated that the predefined device orientations are defined by which one of the top 322, bottom 324, left-hand side 326, right-hand side 328, front face 305, and back face 307 of the device 201 are directed generally upwards. Moreover, it will be appreciated that the device 201 need not be orientated precisely in of one the illustrated device orientations for the determination of the device orientation. Instead, the predefined device orientations act as reference positions. The device orientation is determined by selecting the reference position (e.g., which of the six predefined device orientations shown in FIG. 8A to 8F) is closest to the actual device orientation. Each of the predefined device orientations may be mapped to orientation values measured by the orientation sensor or derived from its measurements in order to determine the reference position which is closest to the actual device orientation. The orientation values may be used to construct an orientation profile of each of the six predefined device orientations. The orientation values which are mapped to the predefined device orientations, in some embodiments, may be defined, directly or indirectly, in terms of pitch (Φ), roll (ρ) and the angle of the z-axis relative to gravity (θ) measured by a three-axis accelerometer, which may calculated using equations (3), (4) and (5) described above.

When the touchscreen display 210 is rectangular in shape as in the illustrated embodiments, the processor 240 (FIG. 1) in accordance with the instructions of the user interface module 226 changes the screen orientation of the GUI to a landscape screen orientation when the mobile communication device 201 is (re)positioned in a generally horizontal direction (such as, for example, in FIGS. 8C and/or 8D), and changes the screen orientation of the GUI to a portrait screen orientation when the mobile communication device 201 is (re)positioned in a generally vertical direction (such as, for example, in FIGS. 8A and/or 8B). The processor 240 may invert or "flip" the screen orientation of the GUI horizontally or vertically if the mobile communication device 201 is flipped horizontally or vertically.

Referring again to the FIG. 8A to 8F, in some embodiments the screen orientation of the GUI is selected in accordance with mappings of screen orientation to device orientation as set forth below (subject to application overrides as described below):

| Device Orientation | Screen Orientation |
|---|---|
| "top up" device orientation (FIG. 8A) | portrait (up) screen orientation |
| "bottom up" device orientation (FIG. 8B) | portrait (down) screen orientation |
| "left up" device orientation (FIG. 8C) | landscape (left) screen orientation |
| "right up" device orientation (FIG. 8D) | landscape (right) screen orientation |
| "front up" device orientation (FIG. 8E) | default/previous screen orientation |
| "back up" device orientation (FIG. 8F) | default/previous screen orientation (or display screen disabled/off) |

Having regard to the above-described screen orientation (also reference to as aspect ratios), it will be appreciated that the screen orientation is portrait in both the "top up" and "bottom up" device orientations shown in FIG. 8A and FIG. 8B, respectively, and that the screen orientation is landscape in both the "left up" and "right up" device orientations shown in FIG. 8C and FIG. 8D, respectively. To differentiate between the variants of the portrait screen orientation in the "top up" and "bottom up" device orientations and landscape screen orientation in the "left up" and "right up" device orientations, a direction of the screen orientation is defined. The direction is relative to a fixed position on the device 201, which is the top 322 of the device 201 in the present embodiment. A different directional reference could be used in other embodiments. Thus, the screen orientation in the "top up" device orientation (FIG. 8A) is the portrait (up) screen orientation because the top 322 of the device 201 is directed upwards relative to the ground and force of gravity ("g"). The screen orientation in the "bottom up" device orientation (FIG. 8B) is the portrait (down) screen orientation because the top 322 of the device 201 is directed downwards relative to the ground and force of gravity. Otherwise stated, in the "bottom up" device orientation of FIG. 8B, the bottom 324 of the device 201 is directed upwards relative to the ground and force of gravity ("g").

The screen orientation in the "left up" device orientation (FIG. 8C) is landscape (left) screen orientation because the top 322 of the device 201 is rotated in the vertical plane towards the left side 326 of the device 201. The screen orientation in the "right up" device orientation (FIG. 8D) is landscape (right) screen orientation because the top 322 of the device 201 is rotated in the vertical plane towards the right side 328 of the device 201.

In some embodiments, the "front up" (FIG. 8E) and "back up" (FIG. 8F) device orientations are not associated with a particular screen orientation, except for a default screen orientation. When in these positions, it is difficult to determine the location of the device relative to the user. Accordingly, it may be difficult to determine whether the user is in a position in which they would prefer a portrait screen orientation or a landscape screen orientation. Accordingly, in at least some embodiments, the screen orientation of device 201 in the "front up" and "back up" device orientations is dependent on the previous screen orientation. That is, the "top up", "bottom up", "left up" and "right up" device orientations have a fixed screen orientation.

As described in more detail below, some of the applications 225 have a screen orientation of the GUI which varies in accordance with the orientation of the device 201; however, one or more of the applications 225, such as the phone application, may a fixed screen orientation which is unaffected by the device orientation.

Referring again to FIG. 2, the control buttons or keys 260, represented individually by references 260a, 260b, 260c, 260d, which are located below the touchscreen display 210 on the front face 305 of the device 201 which generate corresponding input signals when activated. The control keys 260 may be constructed using any suitable key construction, for example, the controls keys 260 may each comprise a dome-switch. In other embodiments, the control keys 260 may be located elsewhere, such as on a side of the device 201. If no control keys are provided, the function of the control keys 260 described below may be provided by one or more virtual keys (not shown), which may be part of a virtual toolbar or virtual keyboard.

In some embodiments, the input signals generated by activating (e.g. depressing) the control keys 260 are context-sensitive depending on the current/active operational mode of the device 201 or current/active application 225. A first key 260a may be a send/answer key which can be used to answer an incoming voice call, bring up a phone application when there is no incoming voice call, and start a phone call from the phone application when a phone number is selected within that application. A second key 260b may be a menu key which invokes context-sensitive menus comprising a list of context-sensitive options. A third key 260c may be an escape/cancel/back key which cancels the current action, reverses (e.g., "back up" or "go back") through previous user interface screens or menus displayed on the touchscreen display 210, or exits the current application 225. A fourth key 260d may be an end/hang up key which ends the current voice call or hides the current application 225.

Although in the illustrated embodiments the case 304 is shown as a single unit it could, among other possible configurations, include two or more case members hinged together (such as a flip-phone configuration or a clam shell-style lap top computer, for example), or could be a "slider phone" in which the keyboard is located in a first body which is slide-ably connected to a second body which houses the display screen, the device being configured so that the first body which houses the keyboard can be slide out from the second body for use. In other embodiments, the mobile communication device 201 could have a mechanical keyboard in addition to the touchscreen display 210.

Organization of Displayed Icons in Icon Array

The present disclosure provides a graphical user interface (GUI) which organizes icons in accordance with the screen orientation of the GUI and changes in the screen orientation. The screen orientation of the GUI may be changed in response to a change in device orientation detected by an orientation sensor of the device 201, or possibly in response to respective input from the device user.

Figure 9A:
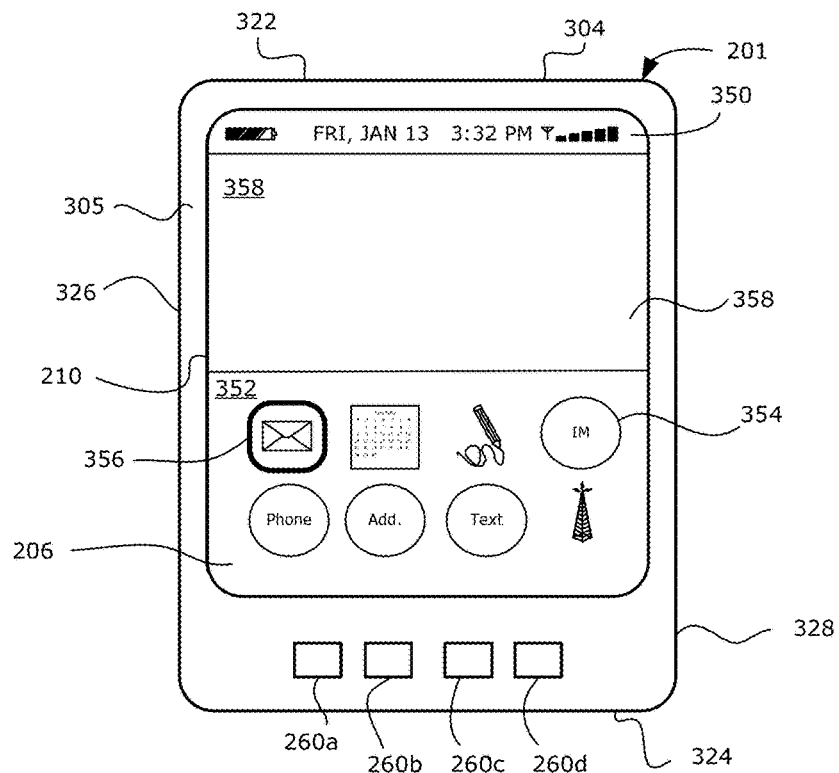
FIG. 9A illustrates a first portrait screen of an icon menu in accordance with one example embodiment of the present disclosure.
Figure 9B:
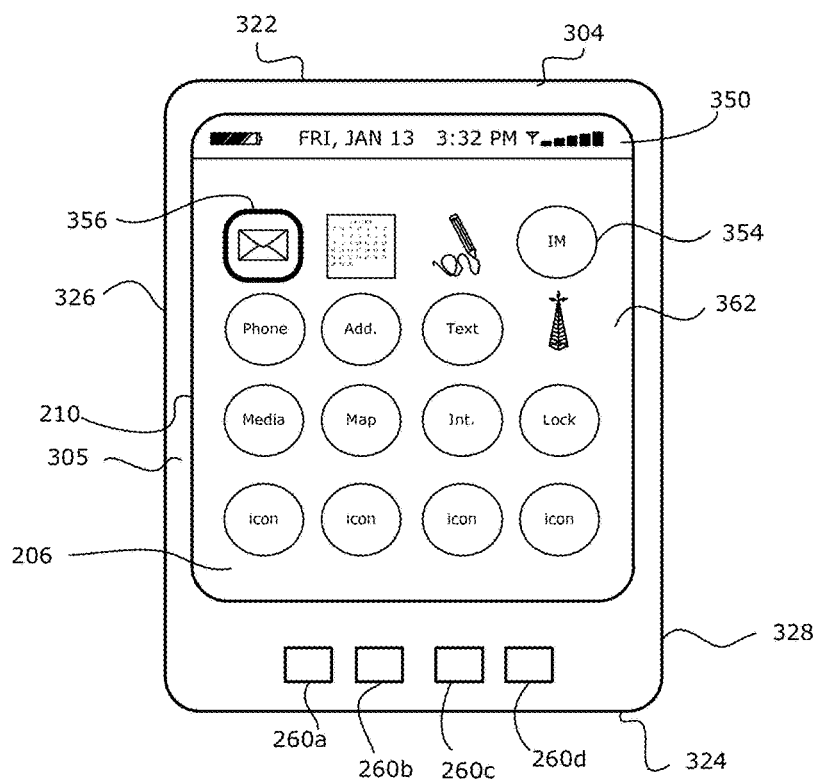
FIG. 9B illustrates a second portrait screen of an icon menu in accordance with one example embodiment of the present disclosure.
Figure 9C:
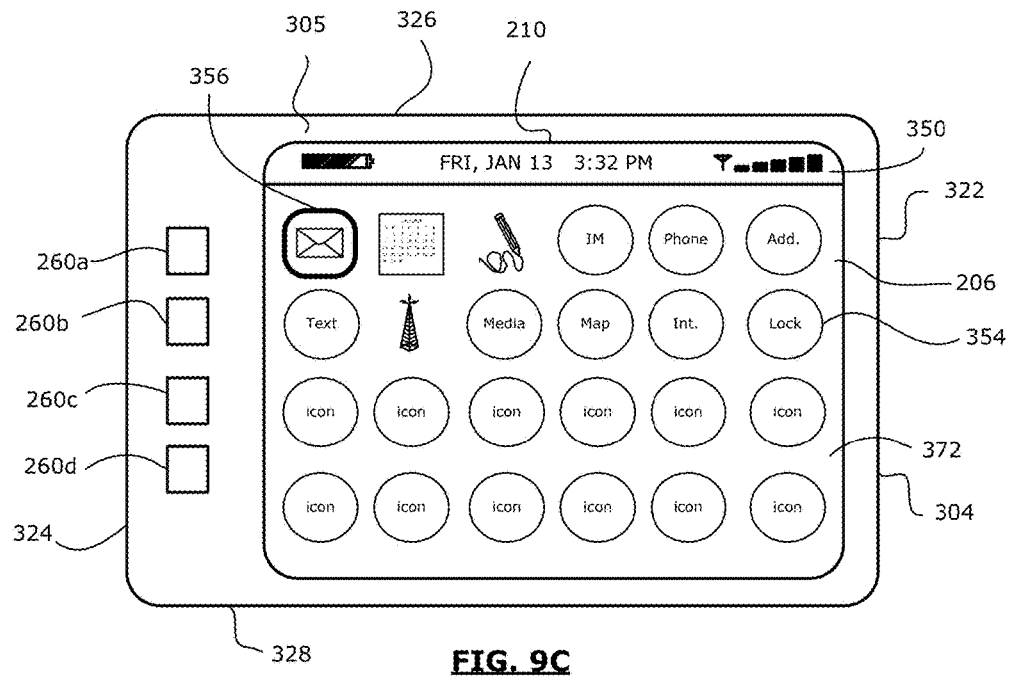
FIG. 9C illustrates a landscape portrait screen of an icon menu in accordance with one example embodiment of the present disclosure.
Figure 9D:
FIG. 9D is an example screen capture of the icon menu of FIG. 9C.
Figure 9E:
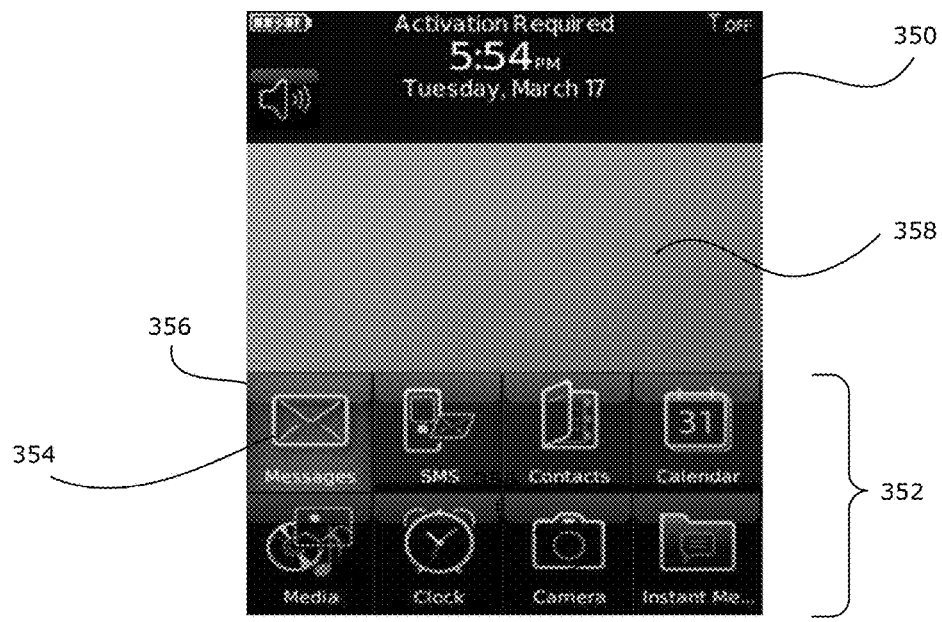
FIG. 9E is an example screen capture of the icon menu of FIG. 9A.
Figure 9F:
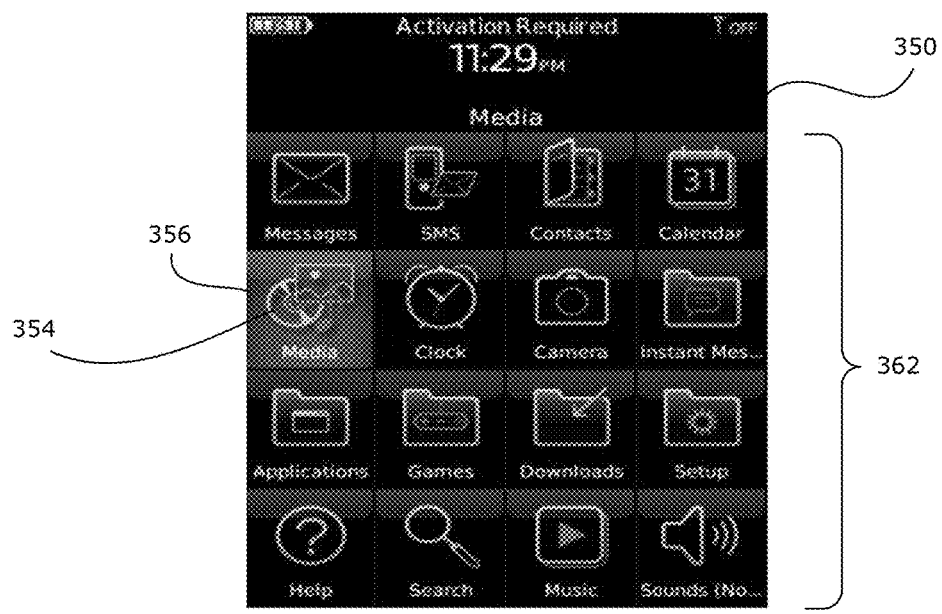
FIG. 9F is an example screen capture of the icon menu of FIG. 9B.

Referring now to FIGS. 9A to 9F, a series of user interface screens of an icon menu for an icon input mode of the device are shown. FIGS. 9A to 9C are schematic illustrations of the user interface screens in the context of the device 201, whereas FIGS. 9D, 9E and 9F are screen captures of example user interface screens of FIGS. 9C, 9A and 9B respectively. The icon menu comprises a plurality of selectable and activatable icons 354 (only one of which is labelled in FIGS. 9A to 9F to avoid obscuring the drawings). The icon menu in the shown embodiment is a home or "main" user interface screen for controlling the device 201, sometimes referred to as the home screen of the device 201 or its operating system 223.

The icon menu in the illustrated embodiment provides icons 354 for starting or activating applications or functions on the device 201. The icons 354 can each be activated via corresponding input via the touchscreen display 210 to start the associated application or function. While the icons 354 are primarily associated with applications 225 on the device 201, one or more of the icons 354 may be associated with a function such as opening an associated folder in a folder-based data storage system of the device 201 or disabling and enabling the communication subsystem 211. The icons 354 may, for example, be used to start a media player application, email messaging application, calendar application, notepad application, or other application. If an icon 354 represents an application, activating the selected icon 354 causes the processor 240 to start the application logically associated with the icon 354 such as, for example, the media player application.

In some embodiments, the icons 354 can be selected using movement of an onscreen position indicator 356 commonly referred to as a caret, cursor or focus, by respective touch input on the touchscreen display 210. Selection of a particular icon 354 causes that icon 354 to become highlighted or focused using the onscreen position indicator 356 or otherwise changed in appearance to provide a visual indication of the selected icon 354. Highlighting of the icon 354 may comprise changing a background colour of the icon 354, changing the icon 354 from a first version (e.g., idle/unselected) to a second version (e.g., active/selected), or both.

The application or function associated with an icon 354 may be activated by clicking or depressing the touchscreen display 210 while the corresponding icon 354 is selected to activate the switch 261. Depressing the switch 261 causes a switch event (or click event) in which an interrupt signal is generated by the switch 261 at the same time that a touch event in which an interrupt signal and possibly serial data signal is generated by the touchscreen display 210. These signals are received by the processor 240 and typically processed via the operating system 223 and/or user interface module 226. The location of the touch input is used by processor 240 to indentify the selected icon 354, whereas the receiving of the interrupt signal generated by the switch 261 is interpreted as input to activate the application or function logically associated with the selected icon 354.

Other selection and activation methods could be used in other embodiments, for example, depressing one of the control buttons 260 could be used to activate icons 354 or other selectable user interface elements of the GUI. If other input devices are provided instead of, or in addition to, the touchscreen display 210, input from such other input devices (such as a keyboard or clickable navigation tool) could be used to navigate the onscreen position indicator 356 and activate icons 354 or other selectable user interface elements of the GUI.

FIGS. 9A and 9E illustrate a first portrait screen of the icon menu in accordance with one embodiment of the present disclosure. The first portrait screen has a portrait screen orientation. The icon menu of FIG. 9A is referred to as a reduced icon menu 352 which comprises an array of icons 354 arranged in rows and columns. The array of icons of the reduced icon menu 352 has one or two rows of icons (two rows of icons 354 in the shown embodiment). In the shown embodiment, the portion of the GUI adjacent to the reduced icon menu 352 (above the reduced icon menu 352 in the shown embodiment) comprises a secondary input area 358. The secondary input area 358 may be used to display a background image for the home screen, sometimes referred to as wallpaper, as well as receive touch inputs for receiving inputs from the device user. In other embodiments, the secondary input area 358 could be replaced with another menu different than the reduced icon menu 352, an application window for displaying a user interface screen for one of the applications 225 of the device 201 (for example, the active application), or any other content. The secondary input area 358 could be scrollable to display additional content which does not fit within the display area provided for the secondary input area 358. In yet other embodiments, secondary input area 358 could be replaced with a static portion which does not generate input signals in response to touch inputs.

In the shown embodiment, a status bar 350 is displayed above the reduced icon menu 352. The status bar 350 includes information such as the current date and time, icon-based notifications, device status and device state. The reduced icon menu 352 in the shown embodiment is non-scrollable/non-expandable and is approximately the same size as the secondary input area 358. In other embodiments, the reduced icon menu 352 and secondary input area 358 could be different sizes and the reduced icon menu 354 could be scrollable.

FIGS. 9B and 9F illustrate a second portrait screen of the icon menu in accordance with one embodiment of the present disclosure. The second portrait screen has a portrait screen orientation like the first portrait screen. Not all embodiments have a second portrait screen. The second portrait screen may be invoked by corresponding input. In some embodiments, when the display screen 204 is part of a depressible touchscreen display 210, the second portrait screen may be invoked be touching the touchscreen display 210 in the secondary input area 358 (see FIG. 9A, 9D) and clicking the touchscreen display 210 so as to activate the switch 261. For example, the secondary input area 358 of the display screen 204 above the reduced icon menu 352 in the first portrait screen of FIG. 9A may act as an input region allowing a user presently viewing a user interface screen in the first portrait screen (FIG. 9A) to switch to the second portrait screen (FIG. 9B).

The second portrait screen shown in FIGS. 9B and 9F has an expanded icon menu 362 which is larger than the reduced icon menu 352 of FIG. 9A, and has more icons 354 displayed than the reduced icon menu 352 of FIG. 9A. In some embodiments, the expanded icon menu 362 may occupy all of, or substantially all of the display screen 204 except for the status bar 350 when the GUI is in the second portrait screen. In some embodiments, the icons 354 of the reduced icon menu 352 are displayed in the same portion of the display screen 204 as the secondary input area 358 of the first portrait screen (i.e., the top of the user interface screen) and additional icons 354 are displayed in the same portion of the display screen as the reduced icon menu 354 of the first portrait screen (i.e., the bottom of the user interface screen).

FIGS. 9C and 9D illustrate a landscape portrait screen of the icon menu in accordance with one embodiment of the present disclosure. The landscape portrait screen has an expanded icon menu 372 which is larger than the reduced icon menu 352 of FIG. 9A, and has more icons 354 than the reduced icon menu 352. The expanded icon menu 372 may have the same number of icons 354 as the expanded icon menu 362 of FIG. 9B, however, it has a different aspect ratio and a landscape screen orientation rather than a portrait screen orientation. In some embodiments, the expanded icon menu 372 may occupy all of, or substantially all of the display screen 204 except for the status bar 350.

In at least some embodiments, the screen orientation (i.e., aspect ratio) is dynamically determined in accordance with the device orientation and changes in device orientation as described more fully below. The screen orientation may be changed from a portrait screen orientation such as that shown in FIG. 9A or 9B to a landscape screen orientation such as that shown in FIG. 9C by rotating the device 201 or otherwise moving the device 201 to invoke the landscape screen orientation. Conversely, the screen orientation may be changed from a landscape screen orientation to a portrait screen orientation by rotating the device 201 or otherwise moving the device 201 to invoke the portrait screen orientation. In this way, the displayed icons and the icon layout/arrangement of the displayed icons of a supported device mode or state can be dynamically controlled (and changed) via the device orientation. Moreover, the required input to transition the GUI to a mode in which an icon array in which many or all of the icons are displayed requires only minor, intuitive input from the user (i.e., the gesture/motion of the device 201 to invoke the change in screen orientation) in contrast to known solutions for changing the icons displayed which typically require more complex input. Conventional solutions for controlling the displayed icons 354 requires individual selection of the icons 354 to be displayed, which requires the device user to navigate through various menus involving a series of prompts and inputs in order to change the icons 354 displayed on the home screen of a mobile device 201.

The expanded icon menu 362 of FIG. 9B and the expanded icon menu 372 of FIG. 9C include more icons than the reduced icon menu 352 of FIG. 9A so that at least more, possibly all, if the icons 354 of the menu may be shown. The expanded icon menus 362, 372 each comprise an array of icons 354 arranged in rows and columns as in the reduced icon menu 352. However, the expanded icon menus 362, 372 have three or more rows of icons 354 whereas the reduced icon menu 352 has one or two rows of icons 354. In the shown embodiment, the expanded icon menus 362 and 372 are scrollable if the icon menus are not large enough to permit all icons 355 to be displayed at once. To scroll the expanded icon menus 362 and 372, corresponding directional input is provided by the user. When the device 201 includes a touchscreen display 210, the user touches the touchscreen display 210 with his or her finger or possibly a stylus and moves the finger in the corresponding direction to provide the directional input. In some embodiments, the expanded icon menus 362, 372 may only be scrollable in a single direction, e.g. up-down or left-right with respect to a top of the user interface screen. In other embodiments, the expanded icon menus 362, 372 may be scrollable in two-dimensions. In contrast, the reduced icon menu 352 of the shown embodiment is non-scrollable.

The reduced icon menu 352 of the first portrait screen of FIG. 9A permits the device user to view a limited number of commonly used icons 352 (which may be configurable), whereas the expanded icon menu 362 of the second portrait screen shown in FIG. 9B and the expanded icon menu 372 of the landscape portrait screen shown in FIG. 9B may permit the device user to access all icons 354 (possibly requiring scrolling to select and activate some of the icons 354 depending on the number and size of the icons 154). This embodiment, in at least some systems, may simplify graphics rendering since the first portrait screen does not need to support all of the icons 354 and does not need to support scrolling of the GUI. This reduces the processing and memory constraints imposed by the GUI. Since the commonly used icons 354 are in the reduced icon menu 352, the frequency with which device users need to access other icons 354 in the second portrait screen or landscape portrait screen may be quite small depending on user preferences.

From a user perspective, the present disclosure provides a solution to cluttered icons on a user interface screen such as the home screen of a device 201 by limiting the icons 354 displayed in the icon menu in the first portrait screen, and displaying the remainder of the icons 354 in the expanded icon menu of the landscape portrait screen or possibly a second portrait screen. Furthermore, the input to invoke the expanded icon menus is relatively minor, being intuitive gestural input from the user or a click event on the secondary input area. Moreover, the remainder of the reduced icon menu 352 allows the secondary input area to be provided. The secondary input area may be used for many different purposes, such as the display of a background image, message or other user interface screen, for example, of an application or function of the device 201.

It will be appreciated that the size of the icons 354 in the reduced icon menu 352 of the portrait screen orientation of FIG. 9A may be different than the size of the icons 354 in one or both of the expanded icon menus of the second portrait screen of FIG. 9B or landscape portrait screen of FIG. 9C. For example, in some embodiments the icons 354 in the portrait screen orientation of FIG. 9A may be narrower than the icons 354 in the landscape portrait screen of FIG. 9C in order to account for differences in screen width between the landscape and portrait screen orientations.

While the icon menu has been described primarily in the context of application icons on the home screen of the device 201, it will be appreciated that the teachings of the present disclosure could be applied to any user interface screen having a number of icons, such as in menus or windows activated to the operating system 223 or applications 225 (FIG. 1).

Figure 10A:
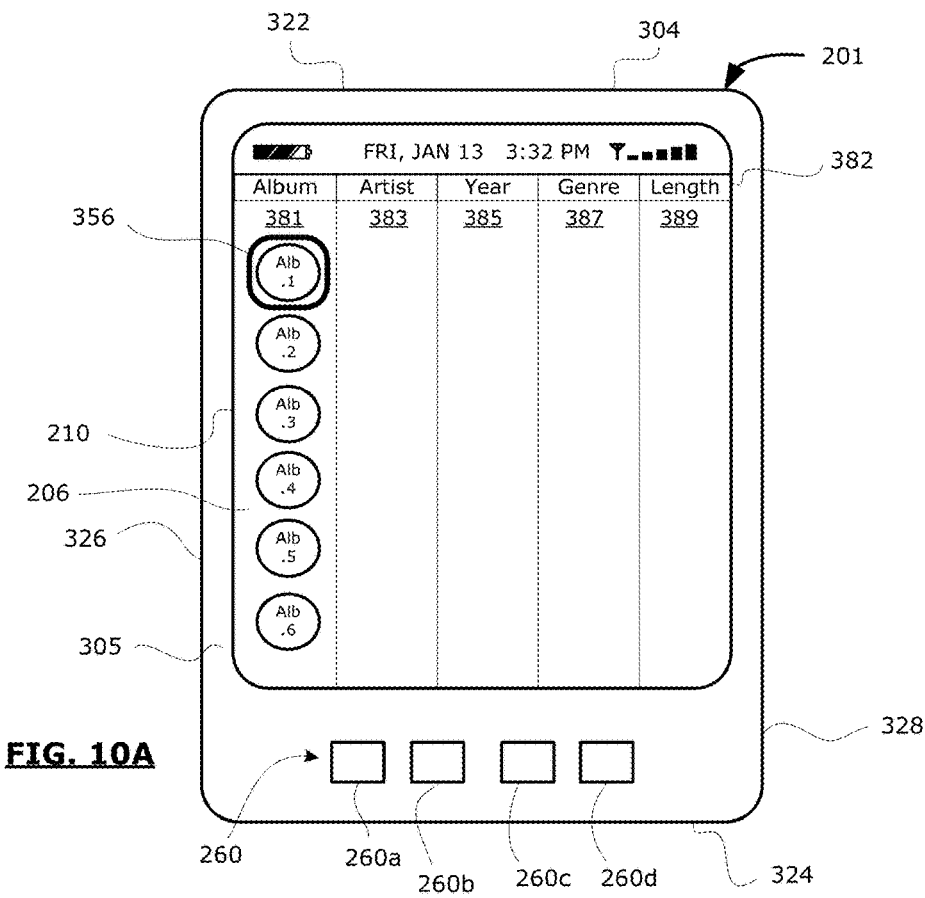
FIG. 10A illustrates a portrait screen orientation of a media player application in accordance with one example embodiment of the present disclosure.

Referring now to FIG. 10A, a portrait screen orientation of the media player application in accordance with one example embodiment of the present disclosure is shown. In the shown embodiment, the portrait screen orientation comprises a list-based user interface screen, in particular, an album list of the media player application. The album list comprises a title bar 382 and a table comprising a number of rows and columns. Each row is an album or track in an album list or track list with each column representing a field in the album or track entry. The title bar 382 includes a label of the respective fields for informational purposes. In the shown embodiment, the fields comprise an album field 381, artist field 383, year field 385, genre field 387, and length field 389. Additional or different fields could be used in other embodiments.

The album field 381 displays the album or track name and/or an icon, or possibly a picture associated with the album or track such as an album art thumbnail image (e.g. album cover art thumbnail image). In the shown embodiment, an onscreen position indicator 356 is provided in the album field 381 for navigating and selecting different albums in the album list or track. The artist field 383 indentifies the artist of the respective album, the year field 385 identifies the year of release of the respective album, the genre field 387 identifies genre associated with the music of the respective album, and the length field 389 identifies the total duration of all tracks of the respective album.

Figure 10B:
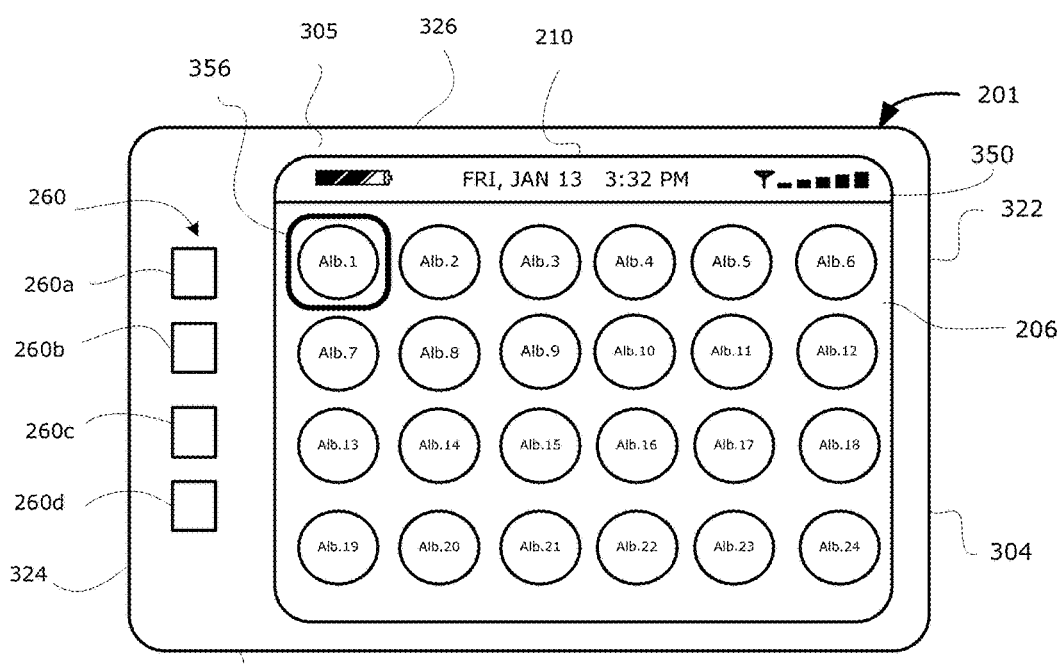
FIG. 10B illustrates a landscape portrait screen of a media player application in accordance with one example embodiment of the present disclosure.

Referring now to FIG. 10B, a landscape portrait screen of a media player application in accordance with one example embodiment of the present disclosure is shown. In the shown embodiment, the landscape portrait screen comprises an icon array of album cover art corresponding to the albums in the album field 381 of the album list. The icons in the icon array could be thumbnail image of album cover art. Scrolling down will display more albums in the album list via the respective album cover art when the album icons are too numerous to be displayed on the display screen 204 all at the same time. In at least some embodiments, to improve navigation side-to-side scrolling (e.g., left-to-right scrolling) is disabled. Navigation in the album icon array is limited to scrolling up and down the albums in the icon array.

In either the portrait screen orientation (FIG. 10A) or landscape portrait screen (FIG. 10B), activation of an album icon displays an album user interface screen (not shown) with detailed information about the album such as a larger representation of the album cover art and track list including track information such as the track numbers, track names, individual track lengths, and possibly track ratings assigned by the device user. Further interaction/input with the detailed album user interface screen may commence playback of the album, for example, in response to receiving input to commence playback of the album or a particular track in the album.

As in the previous example discussed with reference to FIGS. 9A, 9B, 9C, the processor 240 (FIG. 1) may switch between the portrait and landscape screen orientations of the media player application in dependence on an orientation signal received from the orientation subsystem 249. For example, where the device 201 is oriented horizontally so that the width of the display 204 is longer than the height of the display (FIG. 10B), the landscape screen orientation is displayed. In contrast, where the device 201 is oriented so that the width of the display 204 is shorter than the height of the display (FIG. 10A), the portrait screen orientation may be used. In other embodiments, the orientations which trigger the use of either the album art array or the album/track list may be reversed. For example, the list may be used in the landscape orientation to take advantage of the increased screen width to display additional album or track information.

Figure 11:
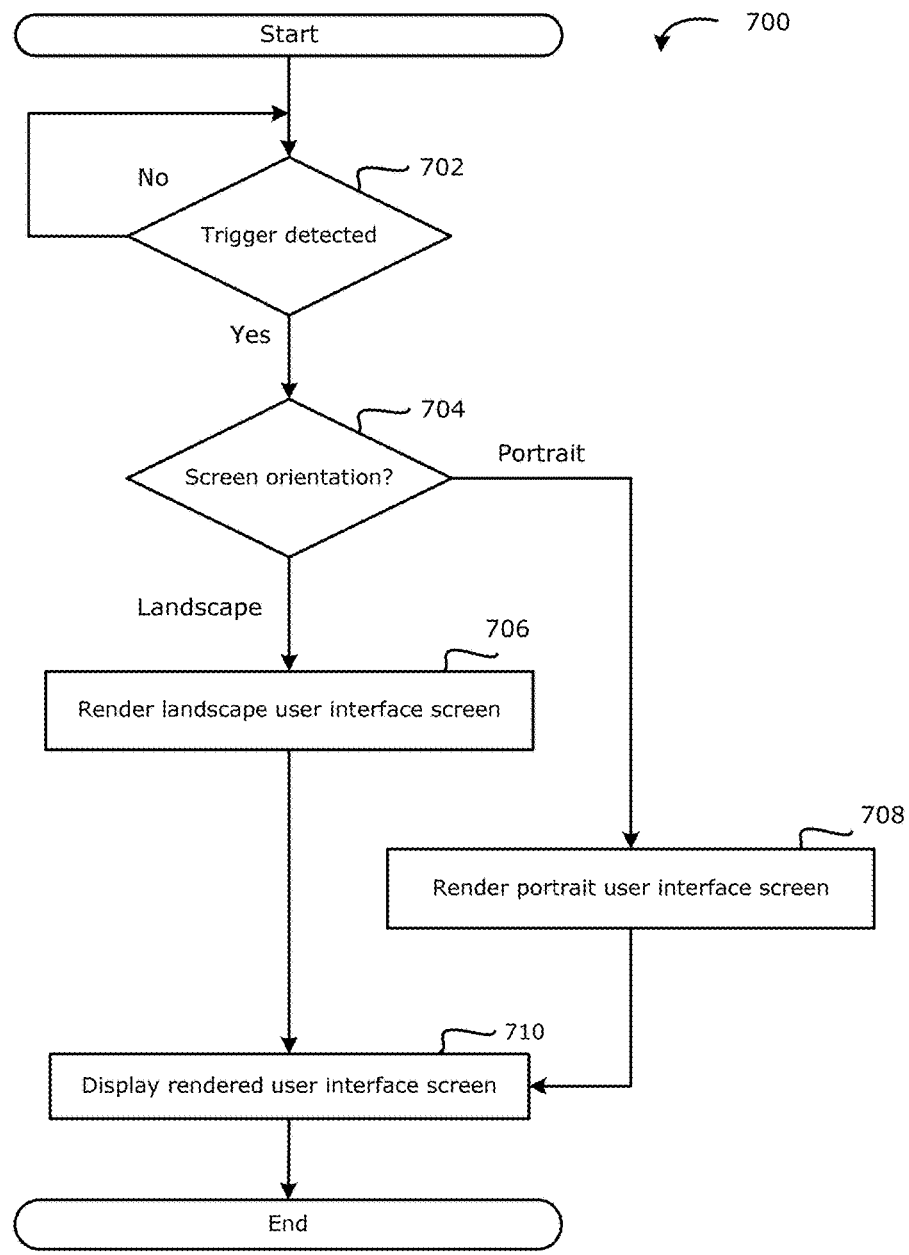
FIG. 11 is a flowchart illustrating example operations for generating a user interface screen in which icons are arranged in accordance with the screen orientation of a graphical user interface (GUI) in accordance with one example embodiment of the present disclosure.

Reference is now made to FIG. 11 which illustrates example operations 700 for generating a user interface screen in which icons are arranged in accordance with the screen orientation of the GUI in accordance with one example embodiment of the present disclosure. The operations 700 are carried out by the processor 240 (FIG. 1) of the mobile communication device 201 under the instruction of the user interface module 226 and/or an active application 225 (also referred to as a foreground application 225) on the device 201, or possibly the operating system 223. The operations 700 are only performed in connection with user interface screens that support an icon mode. Example user interface screens which support an icon mode are the icon menu 352 of the home screen of the device 201 and the album art array of the media player application 228 described above. Because not all user interface screens support an icon mode, in some embodiments a check may be performed as a precondition to commencing the operations 700 (not shown).

The operations 700 are typically performed after the GUI of the device 201 has been returned to its home screen or after an application 225 has become the active application and its initial or opening screen has been displayed. That is, the operations 700 are typically performed in respect of the GUI of the operating system 223 or application 225 after a user interface screen in a default screen orientation has been displayed. The default screen orientation is typically the portrait screen orientation for a "top up" device orientation described above and shown in FIG. 8A. However, the operations 700 could be applied to select the appropriate screen orientation for the initially displayed home screen of the device 201 or the initial user interface screen displayed for an application 225.

In the first step 702, the processor 204 monitors for and detects triggers to display a new user interface screen on the display screen 204. The trigger may be a change in device orientation from a default device orientation (e.g., a "top up" device orientation shown in FIG. 8A) or a change from a previously determined device orientation. In such embodiments, the processor 204 monitors for and detects changes in device orientation and performs the operations 700 when a change in device orientation is detected. The processor 240 detects device orientation changes via orientation signals sent from the device orientation subsystem 249. The orientation signals may include information which specifies the device orientation or information from which device orientation can be determined (e.g., acceleration information when the orientation sensor is an accelerometer). When the operations 700 are performed by the user interface module 226, the device orientation event notifications may be received by the module 226 from the operating system 223 which generates device orientation event notifications in accordance with device orientation changes based on received orientation signals as described elsewhere. In other embodiments, the trigger could be predetermined input in addition to, or instead of, a detected change in device orientation.

Next, in step 704 the processor 240 determines which screen orientation is to be used to display the GUI, based on the device orientation. The user interface module 226 and/or applications 225, depending on the embodiment, apply rules when rendering the GUI including rules which specify which screen orientations are to be used with which device orientations. In some embodiments, the rules map device orientations to screen orientations, for example, using the table described below. The screen orientation is either a portrait screen orientation or a landscape screen orientation. The screen orientation to be used to display the user interface screen is determined based on the device orientation. The device orientation is determined to be any one of the predetermined six (6) device orientations described above. If the device 201 is in one of the "top up", "bottom up", "left up" and "right up" device orientations, the preferred screen orientation is determined in accordance with the following mappings of screen orientation to device orientation:

| Device Orientation | Screen Orientation |
|---|---|
| "top up" device orientation (see FIG. 8A) | portrait (up) screen orientation |
| "bottom up" device orientation (see FIG. 8B) | portrait (down)screen orientation, or portrait (up) screen orientation depending on device settings |

-continued

| Device Orientation | Screen Orientation |
|---|---|
| "left up" device orientation (see FIG. 8C) | landscape (left) screen orientation |
| "right up" device orientation (see FIG. 8D) | landscape (right) screen orientation |

Device orientations different than those described above could be used in different embodiments, and different screen orientations than those described above could be mapped to the device orientations in different embodiments.

If the device 201 is in either of the "front up" (FIG. 8E) or "back up" (FIG. 8F) device orientations, the input plane of the touchscreen display 210 is in the horizontal plane and there is no effective mechanism to unambiguously select a screen orientation for the GUI. As a result, when the device 201 is in either in the "front up" or "back up" device orientation, the screen orientation for the device orientation is typically a previous screen orientation stored in the memory of the device 201, for example, in a run-time memory used by the user interface module 226. The previous screen orientation corresponds to the screen orientation when the device 201 was last in one of the "top up", "bottom up", "left up" and "right up" device orientations.

It will be appreciated that in the described embodiment more than one configuration of the portrait and landscape screen orientations are supported by the device 201 to allow "inverted" portrait and landscape screen orientations to be used, if desired. The portrait "up" and portrait "down" screen orientations, and landscape "left" and landscape "right" screen orientations, differ from each other in the location of the drawing origin on the display screen 204.

If there is no previous screen orientation stored in memory, for example because the device 201 was turned on while positioned horizontally, e.g. while in the "front up" or "back up" device orientation, a default screen orientation for the device 201 is selected as the screen orientation. In at least some embodiments, the default screen orientation is the screen orientation in the "top up" device orientation, i.e. the portrait (up) screen orientation in the described embodiment. A different default screen orientation could be used in other embodiments.

In some embodiments, a check is performed to determine whether the change in device orientation matches a rule for a screen orientation which is different than the current screen orientation. In such embodiments, if the screen orientation has not changed despite a change in the device orientation, the operations 700 end. However, if the screen orientation has changed, the operations 700 continue.

If a portrait screen orientation is to be used (step 704), processing continues to step 708 and the corresponding user interface screen is rendered. The user interface screen could be a home screen of the device 201 such as that shown in FIG. 9A, or possibly a user interface screen of a foreground application 225 such as the media player application shown in FIG. 10A.

If a landscape screen orientation is to be used, processing continues to step 706 and the corresponding user interface screen is rendered. The user interface screen could be a home screen of the device 201 such as that shown in FIG. 9C, or possibly a user interface screen of a foreground application 225 such as the media player application shown in FIG. 10B.

Next, in step 710 after rendering the corresponding user interface screen it is displayed on the display screen 204. Operations 700 then return to step 702 where the device 201 monitors for and detects triggers to display a new user interface screen. While the device 201 is in the icon mode, it will continue to monitor for and detect device orientation changes or other triggers, and change the displayed user interface screen and its icons 354 accordingly.

In some embodiments, additional operations (which may be part of the operations 700) monitor for and detect a predetermined touch input in the secondary input area 358 of the first portrait screen when displayed. When the predetermined touch input is detected in the secondary input area 358 (e.g. a screen click event), the second portrait screen having the expanded icon menu 362 is rendered and then displayed on the display screen 204. After the second portrait screen has been activated, device orientation changes can be used to switch the user interface screen between the second portrait screen and the landscape portrait screen. This operational state will continue until input cancelling the second portrait screen is received while the second portrait screen is displayed. Upon receiving the predetermined cancellation input, for example via depressing the escape/cancel key 260c, device orientation changes can again be used to switch the user interface screen between the first portrait screen.

While the operations 700 have been described as occurring in a particular order, it will be appreciated to persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments.

Communication System

Figure 12:
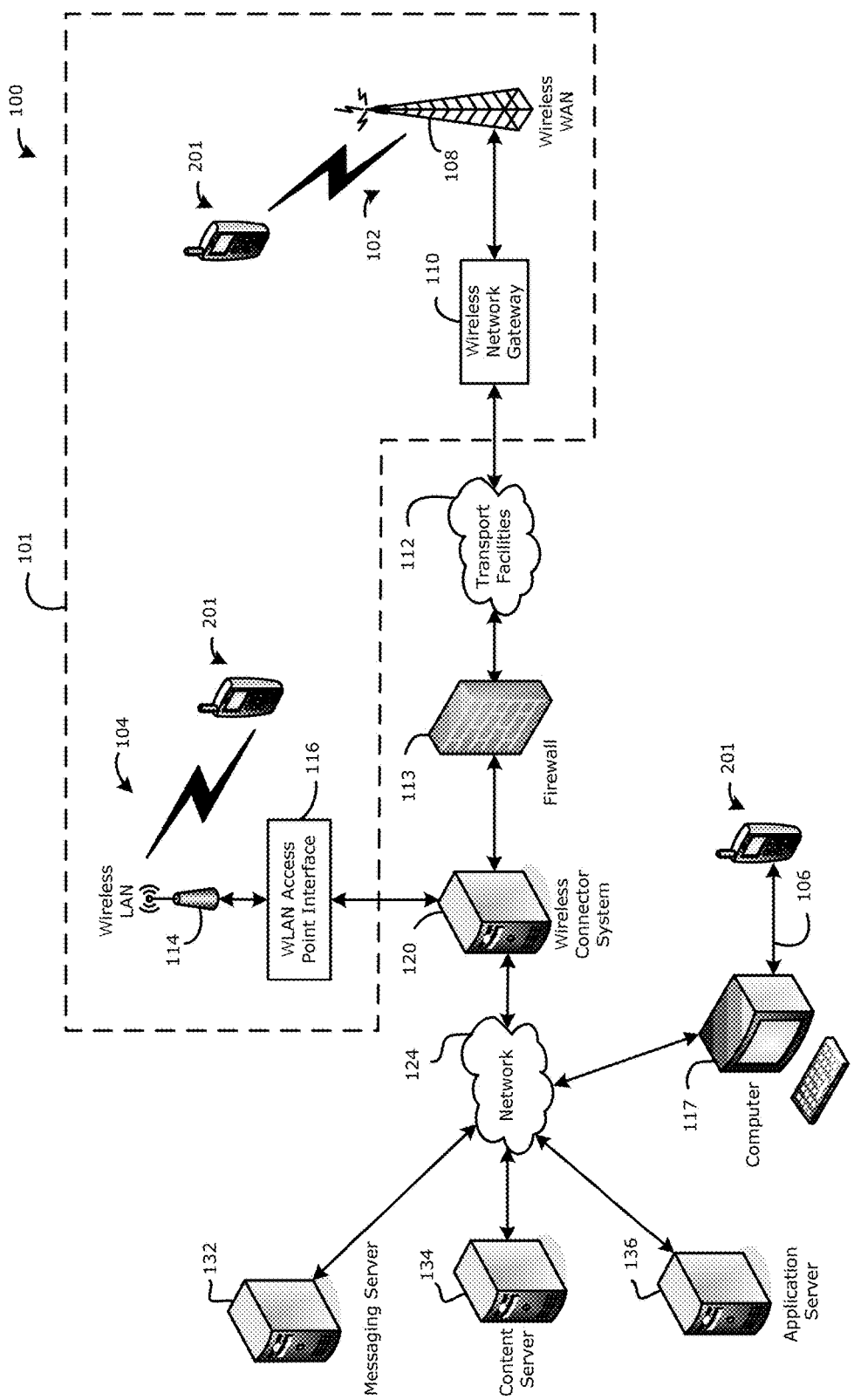
FIG. 12 is a block diagram illustrating a communication system including a mobile communication device to which example embodiments of the present disclosure can be applied.

In order to facilitate an understanding of one possible environment in which example embodiments described herein can operate, reference is made to FIG. 12 which shows in block diagram form a communication system 100 in which example embodiments of the present disclosure can be applied. The communication system 100 comprises a number of mobile communication devices 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly as indicated by the dashed line if FIG. 1 via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device

201 over the WWAN 102 to the wireless connector system 120. The wireless connector system 120 then sends the data packets to the appropriate connection point such as the messaging server 132, content server 134 or application servers 136. Conversely, the wireless connector system 120 sends data packets received, for example, from the messaging server 132, content server 134 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination.

A mobile communication device 201 may alternatively connect to the wireless connector system 120 using a computer 117, such as desktop or notebook computer, via the network 124. A link 106 may be provided for exchanging information between the mobile communication device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a prerecorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method for providing a graphical user interface (GUI) for a media player application of a handheld electronic device, the method comprising:

determining a device orientation of the handheld electronic device in accordance with orientation data from an orientation sensor, wherein the device orientation is chosen from one of a top up device orientation, bottom up device orientation, left up device orientation, right up device orientation, front up device orientation or back up device orientation;

determining a screen orientation of the GUI in accordance with the determined device orientation in response to a determination that the device orientation is one of the top up device orientation, bottom up device orientation, left up device orientation or right up device orientation, wherein the screen orientation is chosen to be a portrait screen orientation in response to a determination that the device orientation is one of the top up device orientation or bottom up device orientation, wherein the screen orientation is chosen to be a landscape screen orientation in response to a determination that the device orientation is one of the left up device orientation or right up device orientation;

determining the screen orientation of the GUI in accordance with a default screen orientation or previous screen orientation in response to a determination that the device orientation is one of the front up device orientation or back up device orientation, wherein the default screen orientation and previous screen orientation are either the portrait screen orientation or the landscape screen orientation;

rendering and displaying an album list user interface screen on a display of the handheld electronic device in the portrait screen orientation in response to a determination that the screen orientation of the GUI is the portrait screen orientation, wherein the album list user interface screen comprises a table comprising a plurality of rows and columns, wherein rows in the table represent albums and columns comprise fields providing information about the respective album, wherein one of the columns in each row includes an album art image that links to an album user interface screen for the respective album, wherein selecting an album art image in the album list causes the album user interface screen for the respective album to be displayed on the display of the handheld electronic device; and rendering and displaying an album array user interface screen on the display of the handheld electronic device in the landscape screen orientation in response to a determination that the screen orientation of the GUI is the landscape screen orientation, wherein the album array user interface screen comprises an array of album art images arranged in rows and columns, wherein album art images in the array of album art images are each linked to the album user interface screen for the respective album, wherein the album array user interface screen is configured for navigation in an up-and-down direction relative to the landscape screen orientation, wherein selecting an album art image in the album array causes the album user interface screen for the respective album to be displayed on the display of the handheld electronic device.

2. The method of claim 1, further comprising:
when the album list user interface screen is displayed on the display, displaying on the display of the handheld electronic device the album user interface screen for the respective album in the album list when the album art image in the album list is selected via corresponding input.

3. The method of claim 1, further comprising:
when the album array user interface screen is displayed on the display, displaying on the display of the handheld electronic device the album user interface screen for the respective album in the array of album art images when the album art image in the album array is selected via corresponding input.

4. The method of claim 1, wherein the album user interface screen provides detailed information about the respective album including a larger album art image and a track list including tracks for the respective album including track numbers, track names, individual track lengths, and track ratings.

5. The method of claim 1, wherein the operations are performed at regular intervals and the GUI is re-rendered and re-displayed only in response to a change in the determined device orientation in which the change in the determined device orientation corresponds to a change in the screen orientation of the GUI.

6. The method of claim 1, wherein the columns of the album list comprise an album field in which the album art for the respective album is located, an artist field, a year field, a genre field, and a length field.

7. The method of claim 6, wherein the album field comprises an album name and the album art for the respective album.

8. The method of claim 1, wherein the album array user interface screen has a landscape left screen orientation in response to a determination that the device is in the left up device orientation, wherein the album array user interface screen has a landscape right screen orientation in response to a determination that the device is in the right up device orientation.

9. The method of claim 1, wherein the album list user interface screen has a portrait up screen orientation in response to a determination that the device is in the top up device orientation, wherein the album list user interface screen has a portrait down screen orientation in response to a determination that the device is in the bottom up device orientation.

10. A handheld electronic device, comprising:
a controller;
a display coupled to the controller;
an orientation sensor connected to the controller for generating an orientation signal in dependence on the orientation of the handheld electronic device;
a memory connected to the controller, the memory having stored thereon a user interface module for generating a graphical user interface on the display;
wherein the controller is configured by the user interface module to:
determine a device orientation of the handheld electronic device in accordance with orientation data from an orientation sensor, wherein the device orientation is chosen from one of a top up device orientation, bottom up device orientation, left up device orientation, right up device orientation, front up device orientation or back up device orientation;
determine a screen orientation of the GUI in accordance with the determined device orientation in response to a determination that the device orientation is one of the top up device orientation, bottom up device orientation, left up device orientation or right up device orientation, wherein the screen orientation is chosen to be a portrait screen orientation in response to a determination that the device orientation is one of the top up device orientation or bottom up device orientation, wherein the screen orientation is chosen to be a landscape screen orientation in response to a determination that the device orientation is one of the left up device orientation or right up device orientation;
determine the screen orientation of the GUI in accordance with a default screen orientation or previous screen orientation in response to a determination that the device orientation is one of the front up device orientation or back up device orientation, wherein the default screen orientation and previous screen orientation are either the portrait screen orientation or the landscape screen orientation;
render and display an album list user interface screen on the display of the handheld electronic device in the portrait screen orientation in response to a determination that the screen orientation of the GUI is the portrait screen orientation, wherein the album list user interface screen comprises a table comprising a plurality of rows and columns, wherein rows in the table represent albums and columns comprise fields providing information about the respective album, wherein one of the columns in each row includes an album art image that links to an album user interface screen for the respective album, wherein selecting an album art image in the album list causes the album user interface screen for the respective album to be displayed on the display of the handheld electronic device; and render and display an album array user interface screen on the display of the handheld electronic device in the landscape screen orientation in response to a determination that the screen orientation of the GUI is the landscape screen orientation, wherein the album array user interface screen comprises an array of album art images arranged in rows and columns, wherein album art images in the array of album art images are each linked to the album user interface screen for the respective album, wherein the album array user interface screen is configured for navigation in an up-and-down direction relative to the landscape screen orientation, wherein selecting an album art image in the album array causes the album user interface screen for the respective album to be displayed on the display of the handheld electronic device.

11. The handheld electronic device of claim 10, wherein the controller is further configured by the user interface module to:
when the album list user interface screen is displayed on the display, display on the display of the handheld electronic device the album user interface screen for the respective album in the album list when the album art image in the album list is selected via corresponding input.

12. The handheld electronic device of claim 10, wherein the controller is further configured by the user interface module to:
when the album array user interface screen is displayed on the display, display on the display of the handheld electronic device the album user interface screen for the respective album in the array of album art images when the album art image in the album array is selected via corresponding input.

13. The handheld electronic device of claim 10, wherein the album user interface screen provides detailed information about the respective album including a larger album art image and a track list including tracks for the respective album including track numbers, track names, individual track lengths, and track ratings.

14. The handheld electronic device of claim 10, wherein the controller is further configured by the user interface module to perform the operations at regular intervals and the GUI is re-rendered and re-displayed only in response to a change in the determined device orientation in which the change in the determined device orientation corresponds to a change in the screen orientation of the GUI.

15. The handheld electronic device of claim 10, wherein the columns of the album list comprise an album field in which the album art for the respective album is located, an artist field, a year field, a genre field, and a length field.

16. The handheld electronic device of claim 15, wherein the album field comprises an album name and the album art for the respective album.

17. The handheld electronic device of claim 10, wherein the album array user interface screen has a landscape left screen orientation in response to a determination that the device is in the left up device orientation, wherein the album array user interface screen has a landscape right screen orientation in response to a determination that the device is in the right up device orientation.

18. The handheld electronic device of claim 10, wherein the album list user interface screen has a portrait up screen orientation in response to a determination that the device is in the top up device orientation, wherein the album list user interface screen has a portrait down screen orientation in response to a determination that the device is in the bottom up device orientation.

19. A non-transitory machine readable medium having tangibly stored thereon executable instructions for execution by a controller of a handheld electronic device comprising a display and an orientation sensor connected to the controller for generating an orientation signal in dependence on the orientation of the handheld electronic device, wherein the executable instructions, when executed by the controller of the handheld electronic device, cause the handheld electronic device to:
determine a device orientation of the handheld electronic device in accordance with orientation data from an orientation sensor, wherein the device orientation is chosen from one of a top up device orientation, bottom up device orientation, left up device orientation, right up device orientation, front up device orientation or back up device orientation;
determine a screen orientation of the GUI in accordance with the determined device orientation in response to a determination that the device orientation is one of the top up device orientation, bottom up device orientation, left up device orientation or right up device orientation, wherein the screen orientation is chosen to be a portrait screen orientation in response to a determination that the device orientation is one of the top up device orientation or bottom up device orientation, wherein the screen orientation is chosen to be a landscape screen orientation in response to a determination that the device orientation is one of the left up device orientation or right up device orientation;
determine the screen orientation of the GUI in accordance with a default screen orientation or previous screen orientation in response to a determination that the device orientation is one of the front up device orientation or back up device orientation, wherein the default screen orientation and previous screen orientation are either the portrait screen orientation or the landscape screen orientation;
render and display an album list user interface screen on the display of the handheld electronic device in the portrait screen orientation in response to a determination that the screen orientation of the GUI is the portrait screen orientation, wherein the album list user interface screen comprises a table comprising a plurality of rows and columns, wherein rows in the table represent albums and columns comprise fields providing information about the respective album, wherein one of the columns in each row includes an album art image that links to an album user interface screen for the respective album, wherein selecting an album art image in the album list causes the album user interface screen for the respective album to be displayed on the display of the handheld electronic device; and
render and display an album array user interface screen on the display of the handheld electronic device in the landscape screen orientation in response to a determination that the screen orientation of the GUI is the landscape screen orientation, wherein the album array user interface screen comprises an array of album art images arranged in rows and columns, wherein album art images in the array of album art images are each linked to the album user interface screen for the respective album, wherein the album array user interface screen is configured for navigation in an up-and-down direction relative to the landscape screen orientation, wherein selecting an album art image in the album array causes the album user interface screen for the respective album to be displayed on the display of the handheld electronic device.

20. The non-transitory machine readable medium device of claim 19, wherein the executable instructions, when executed by the controller of the handheld electronic device, cause the handheld electronic device to:

when the album list user interface screen is displayed on the display, display on the display of the handheld electronic device the album user interface screen for the respective album in the album list when the album art image in the album list is selected via corresponding input.

21. The non-transitory machine readable medium device of claim 19, wherein the executable instructions, when executed by the controller of the handheld electronic device, cause the handheld electronic device to:

when the album array user interface screen is displayed on the display, display on the display of the handheld electronic device the album user interface screen for the respective album in the array of album art images when the album art image in the album array is selected via corresponding input.

22. The non-transitory machine readable medium of claim 19, wherein the album user interface screen provides detailed information about the respective album including a larger album art image and a track list including tracks for the respective album including track numbers, track names, individual track lengths, and track ratings.

23. The non-transitory machine readable medium of claim 19, wherein the executable instructions, when executed by the controller of the handheld electronic device, cause the handheld electronic device to perform the operations at regular intervals and the GUI is re-rendered and re-displayed only in response to a change in the determined device orientation in which the change in the determined device orientation corresponds to a change in the screen orientation of the GUI.

24. The non-transitory machine readable medium of claim 19, wherein the columns of the album list comprise an album field in which the album art for the respective album is located, an artist field, a year field, a genre field, and a length field.

25. The non-transitory machine readable medium of claim 24, wherein the album field comprises an album name and the album art for the respective album.

26. The non-transitory machine readable medium of claim 19, wherein the album array user interface screen has a landscape left screen orientation in response to a determination that the device is in the left up device orientation, wherein the album array user interface screen has a landscape right screen orientation in response to a determination that the device is in the right up device orientation.

27. The non-transitory machine readable medium of claim 19, wherein the album list user interface screen has a portrait up screen orientation in response to a determination that the device is in the top up device orientation, wherein the album list user interface screen has a portrait down screen orientation in response to a determination that the device is in the bottom up device orientation.

* * * * *